United States Patent
Pierron et al.

(10) Patent No.: US 12,023,753 B2
(45) Date of Patent: Jul. 2, 2024

(54) FRICTION STIR WELDING HEAD AND METHOD USING THE SAME

(71) Applicant: Stirweld, Saint Gregoire (FR)

(72) Inventors: Thomas Pierron, Lille (FR); Gilles Sevestre, Nantes (FR); Laurent Dubourg, Saint Gregoire (FR)

(73) Assignee: Stirweld (FR)

( * ) Notice: Subject to any disclaimer, the term of this patent is extended or adjusted under 35 U.S.C. 154(b) by 0 days.

(21) Appl. No.: 17/720,690

(22) Filed: Apr. 14, 2022

(65) Prior Publication Data

US 2022/0331897 A1  Oct. 20, 2022

(30) Foreign Application Priority Data

Apr. 16, 2021  (FR) ...................................... 2103957

(51) Int. Cl.
*B23K 20/00*  (2006.01)
*B23K 20/12*  (2006.01)

(52) U.S. Cl.
CPC ................................ *B23K 20/1255* (2013.01)

(58) Field of Classification Search
CPC .. B23K 20/123; B23K 20/125; B23K 20/122; B23K 20/1255; B23K 20/26; B23K 20/126; B23K 20/1245
See application file for complete search history.

(56) References Cited

U.S. PATENT DOCUMENTS 6,484,924 B1 * 11/2002  Forrest ................ B23K 20/126
                                                228/2.1
6,732,900 B2 * 5/2004  Hansen ................ B23K 20/125
                                                228/2.1
6,874,672 B2 * 4/2005  Okamoto ............. B23K 20/122
                                                228/2.1
7,641,096 B2 * 1/2010  Burton ................ B23K 20/125
                                                228/2.1
8,196,300 B2 * 6/2012  Imamura .............. B23K 20/123
                                                29/877
9,700,958 B2 * 7/2017  Bergmann ......... B23K 20/1255
2007/0040007 A1  2/2007  Sato
2007/0267462 A1 * 11/2007  Burton ................ B23K 20/125
                                                228/114.5

(Continued)

FOREIGN PATENT DOCUMENTS

JP  2005211971 A  8/2005
JP  2007216286 A  8/2007

OTHER PUBLICATIONS

Search Report for French Application No. FR2103957 dated Feb. 7, 2022. 16 pgs. [see p. 3, categorizing the cited references].

*Primary Examiner* — Erin B Saad
(74) *Attorney, Agent, or Firm* — Lerner David LLP

(57) ABSTRACT

The present invention relates to a friction stir welding head including a central pin shaft, a peripheral shoulder part, a shaft for driving in rotation the part and the shaft about the axis, the shaft being integral in rotation with the part and being free in translation with respect to the part along the axis, the head including an external interface part intended to be secured to a rotary spindle of the machine, a device for transmitting the rotation of the shaft about the axis of rotation from the part and a device for driving in translation the shaft along the axis from the motor during the rotation of the shaft and of the part.

15 Claims, 16 Drawing Sheets

(56) References Cited

U.S. PATENT DOCUMENTS

| | | | | |
|---|---|---|---|---|
| 2007/0284419 A1* | 12/2007 | Matlack | ............... | B23K 20/26 |
| | | | | 228/2.1 |
| 2008/0006677 A1* | 1/2008 | Kumagai | ............ | B23K 20/125 |
| | | | | 228/101 |
| 2008/0128472 A1* | 6/2008 | Park | ................. | B23K 20/1255 |
| | | | | 228/2.1 |
| 2010/0072261 A1* | 3/2010 | Cruz | ................. | B23K 20/123 |
| | | | | 228/2.1 |
| 2010/0140324 A1* | 6/2010 | Fleming | ............ | B23K 20/125 |
| | | | | 228/103 |
| 2010/0301795 A1* | 12/2010 | Sato | ..................... | B23K 11/31 |
| | | | | 318/646 |
| 2011/0079339 A1* | 4/2011 | Cruz | ................. | B23K 20/123 |
| | | | | 228/2.1 |
| 2011/0099808 A1* | 5/2011 | Imamura | .......... | B23K 20/1265 |
| | | | | 29/761 |
| 2012/0118937 A1* | 5/2012 | Enzaka | ............. | B23K 20/123 |
| | | | | 228/2.1 |
| 2013/0255884 A1* | 10/2013 | Baumann | ............ | B32B 38/18 |
| | | | | 228/2.1 |
| 2014/0067286 A1* | 3/2014 | Castillo | .............. | B23K 20/122 |
| | | | | 702/41 |
| 2017/0320161 A1* | 11/2017 | Weigl | .................. | B23K 20/123 |
| 2018/0056436 A1* | 3/2018 | Thomas | .............. | B23K 20/128 |
| 2018/0297146 A1* | 10/2018 | Tomioka | ............ | B23K 20/125 |
| 2020/0306869 A1* | 10/2020 | Hardwick | ........... | B23K 20/227 |
| 2020/0376590 A1* | 12/2020 | Weigl | .................. | B23K 20/1255 |
| 2022/0101205 A1* | 3/2022 | Chandra | ............. | G06N 20/00 |
| 2022/0126394 A1* | 4/2022 | Ishiguro | ............. | B23K 20/125 |
| 2022/0143768 A1* | 5/2022 | Figner | .................. | B23Q 5/045 |

\* cited by examiner

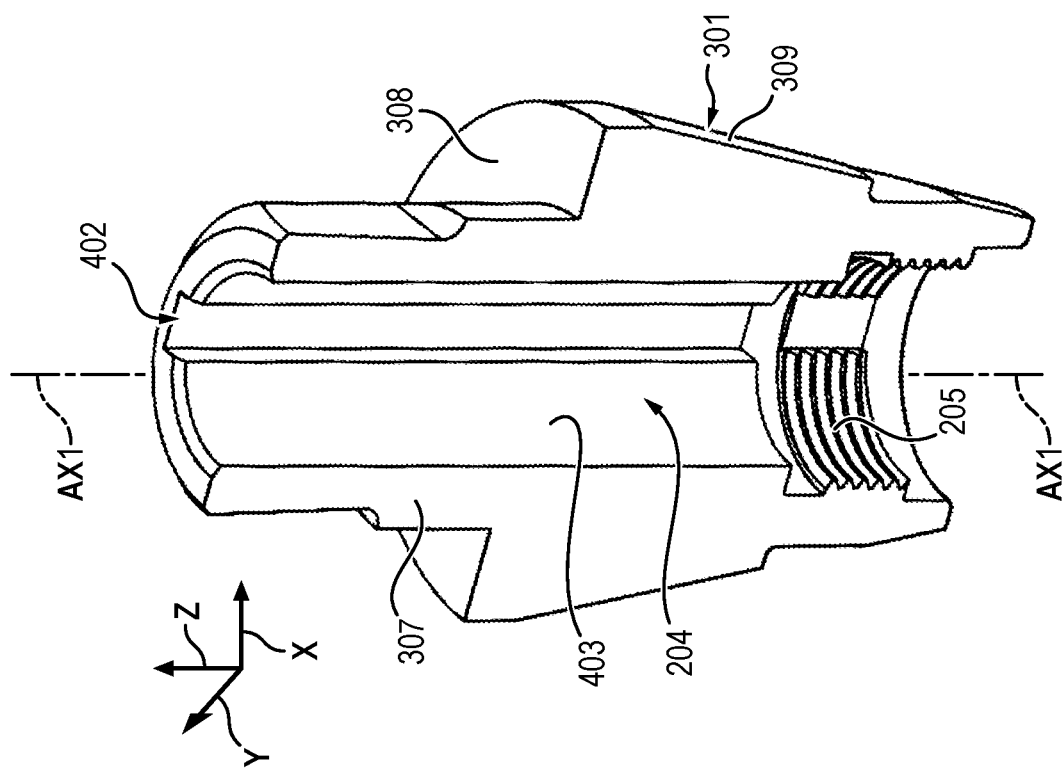
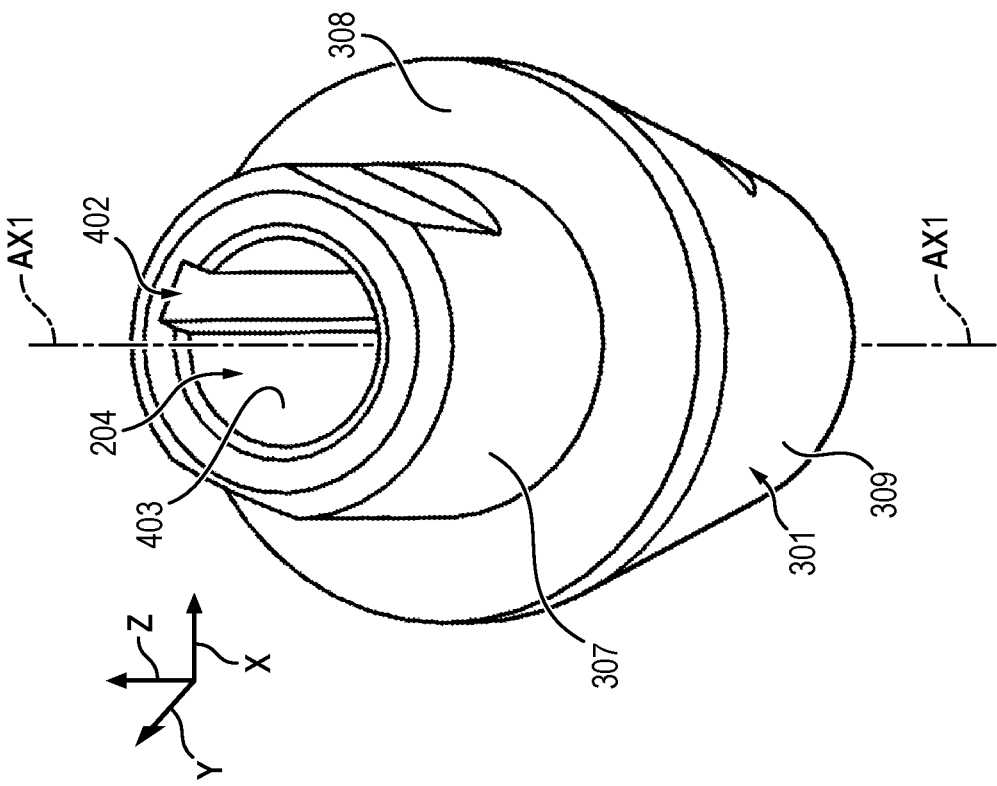

FRICTION STIR WELDING HEAD AND METHOD USING THE SAME

CROSS-REFERENCE TO RELATED APPLICATIONS

The present application claims priority from French Application No. 2103957 filed Apr. 16, 2021, the disclosure of which is hereby incorporated herein by reference.

FIELD OF INVENTION

The invention relates to a friction stir welding head, as well as a friction stir welding method.

A field of application of the invention relates to machine tools, for example numerically-controlled machine tools.

Particularly, the invention aims to be able to perform friction stir welding using a machine tool having a rotating spindle rotated by a motor of the machine.

BACKGROUND OF THE INVENTION

Friction stir welding involves a specific welding tool, comprising a central pin protruding from a peripheral shoulder. This welding tool is rotated to get into the two mechanical pieces to be welded and is moved while rotating along a joint line of these two pieces according to a prescribed path to create a weld line between the two pieces.

Conventional friction stir welding leaves a hole in the mechanical pieces when the welding is completed, after the exit of the welding tool. This hole can be a problem in some fields of application, in particular aeronautics and space.

The function of filling the hole at the end of the welding thanks to a retractable pin exists for friction stir welding robots.

On the other hand, the function of filling the hole at the end of the welding thanks to a retractable pin does not exist for universal friction stir welding heads, to be mounted on numerically-controlled machine tools and machining centers or machines.

Indeed, the retractable pin on the friction stir welding robots is specific to these robots and is difficult to adapt to such universal friction stir welding heads.

BRIEF SUMMARY OF THE INVENTION

One objective of the invention is to obtain a friction stir welding head (and a friction stir welding method), which is provided with a retractable pin and which is compact and universal in order to be able to be mounted directly on numerically-controlled machine tools and compact machining centers or machines having simply a spindle for driving in rotation the welding tool, in order to be able to fill the hole at the end of the welding between the two mechanical pieces to be welded, in order to overcome the drawbacks mentioned above.

To this end, a first subject matter of the invention is a friction stir welding head, intended to be secured to a machine for carrying out friction stir welding using a tool comprising a peripheral shoulder and a central pin, which is surrounded by the peripheral shoulder about a first axis of rotation and which is able to protrude from the peripheral shoulder, the head comprising a frame, intended to be secured to a chassis of the machine, the head comprising a central rotary shaft to which the central pin is intended to be secured, a shoulder securing part, which is located about the central shaft and to which the peripheral shoulder is intended to be secured, the head further comprising a primary rotary shaft for driving in rotation both the shoulder securing part and the central rotary shaft about the first axis of rotation, the central rotary shaft and the shoulder securing part having a coupling device for coupling them to each other, so that the central rotary shaft is integral in rotation with the shoulder securing part about the first axis of rotation and so that the central rotary shaft is free in translation with respect to the shoulder securing part along the first axis of rotation, the head comprising an external interface part intended to be secured to a rotary spindle of the machine and a first rotation transmission device for transmitting the rotation of the external interface part to the primary rotary shaft about the first axis of rotation, the external interface part projecting from an upper surface of the frame, the head comprising a motor and a second translational drive device for driving in translation the central rotary shaft along the first axis of rotation from the motor during the rotation of the central rotary shaft and of the shoulder securing part about the first axis of rotation, between at least a low position of the central rotary shaft, in which the central pin protrudes from the peripheral shoulder along the first axis of rotation and a high position of the central rotary shaft, in which the central pin does not protrude from the peripheral shoulder along the first axis of rotation.

According to one embodiment of the invention, the first axis of rotation, the central rotary shaft and the primary rotary shaft are offset and parallel with respect to a second axis of rotation of the external interface part.

According to one embodiment of the invention, the first rotation transmission device comprises a secondary shaft integral in rotation with the external interface part about the second axis of rotation, a first pulley secured about the secondary shaft, a second pulley secured about the primary rotary shaft and a rotation transmission belt between the first pulley and the second pulley to transmit the rotation of the external interface part about the second axis of rotation to the primary rotary shaft about the first axis of rotation.

According to one embodiment of the invention, the motor comprises a tertiary rotary shaft about a third axis of rotation, the second translational drive device comprises an intermediate shaft which is coaxial and offset with respect to the central rotary shaft, a rotation transmission mechanism for transmitting the rotation of the tertiary rotary shaft about the third axis of rotation to the intermediate shaft about the first axis of rotation and a rotation transformation mechanism for transforming the rotation of the intermediate shaft about the first axis of rotation in translation of the central rotary shaft along the first axis of rotation.

According to one embodiment of the invention, the tertiary shaft of the motor is rotatable about the third axis of rotation offset and transverse with respect to the first axis of rotation, the rotation transmission mechanism comprises an angle transmission mechanism of the tertiary rotary shaft about the third axis of rotation to the intermediate shaft about the first axis of rotation.

According to one embodiment of the invention, the angle transmission mechanism of the tertiary rotary shaft comprises at least a first worm screw integral in rotation with the tertiary shaft and at least a second toothed wheel integral in rotation about the intermediate shaft, the second toothed wheel meshing with the first worm screw.

According to one embodiment of the invention, the rotation transformation mechanism comprises a first threaded member, which is secured to or formed by the intermediate shaft, a second tapped member, which is integral in translation with the central shaft along the first axis of rotation, and a rotation blocking element for blocking rotation of the second tapped member, the first threaded member cooperating by a screw connection with the second tapped member about the first axis of rotation, the rotation blocking element being secured to an internal plate, about which the intermediate shaft is rotatably mounted, the internal plate being mounted in the frame.

According to one embodiment of the invention, the first threaded member is a screw secured to or formed by the intermediate shaft, the second tapped member is a nut screwed about the screw.

According to another embodiment of the invention, the rotation transformation mechanism comprises a first tapped member, which is secured to or formed by the intermediate shaft, a second threaded member, which is integral in translation with the central shaft along the first axis of rotation, and a rotation blocking element for blocking rotation of the first tapped member, the first tapped member cooperating by a screw connection with the second threaded member about the first axis of rotation, the blocking element being secured to an internal plate, about which the intermediate shaft is rotatably mounted, the internal plate being mounted in the frame, the first tapped member is a nut secured to the intermediate shaft, the second threaded member is a screw, the nut being screwed about the screw.

According to one embodiment of the invention, the rotation transformation mechanism comprises a sleeve, which comprises a first side secured about the second member and a second side in which a rotation support bearing of the central shaft about the first axis of rotation is secured.

According to one embodiment of the invention, the rotation support bearing is a bearing assembly, comprising at least a first bearing portion secured in the second side of the sleeve and at least a second bearing portion secured to the central shaft and rotatable with respect to the first bearing portion.

According to one embodiment of the invention, the sleeve is inserted into an internal cavity of the primary rotary shaft and is movable in translation along the first axis of rotation in the internal cavity.

According to one embodiment of the invention, the coupling device comprises a first coupling portion secured to the central rotary shaft and a second coupling portion secured in the shoulder securing part, the first coupling portion cooperating by a sliding connection with the second coupling portion along the first axis of rotation and being integral in rotation with the second coupling portion.

According to one embodiment of the invention, the first coupling portion is protruding on the central rotary shaft transversely to the first axis of rotation, the second coupling portion is a groove, which extends over an internal surface of the shoulder securing part along the first axis of rotation and in which the first coupling portion is movable in translation along the first axis of rotation while being blocked in rotation about the first axis of rotation.

According to one embodiment of the invention, in the high position the central pin is retracted above a lower surface of the peripheral shoulder.

According to one embodiment of the invention, the shoulder securing part and the peripheral shoulder are in one piece.

A second subject matter of the invention is a method for friction-stir welding pieces using the friction stir welding head as described above, the frame of the friction stir welding head being mounted on a machine, the external interface part of the friction stir head projecting from an upper surface of the frame of the friction stir welding head and being secured to a rotary spindle of the machine, the method comprising commanding by a motor control device for controlling the motor the central pin to move out of the peripheral shoulder up to the low position, commanding by a machine control device for controlling the machine the rotary spindle of the machine to rotate to cause the peripheral shoulder and the central pin to rotate about the first axis of rotation, lowering by the machine control device the friction stir welding head towards the pieces, in order to lower the peripheral shoulder and the central pin protruding out of the peripheral shoulder, which both rotate about the first axis of rotation, against the pieces, commanding by the motor control device the central pin to translate with respect to the peripheral shoulder so that a lower end of the central pin is moved closer or away with respect to the peripheral shoulder, while on the one hand the peripheral shoulder, which is in contact against the pieces, and on the other hand the central pin, both rotate about the first axis of rotation, moving the friction stir welding head away with respect to the pieces.

The invention will be better understood upon reading the following description, given only by way of non-limiting example with reference to the figures below of the appended drawings.

BRIEF DESCRIPTION OF THE DRAWINGS

FIG. 16 represents a schematic perspective view of a portion of the welding head according to embodiments of the invention.

FIG. 17 represents a vertical cross-sectional schematic perspective view of a portion of the welding head according to embodiments of the invention.

DETAILED DESCRIPTION OF THE INVENTION

Figure 1:
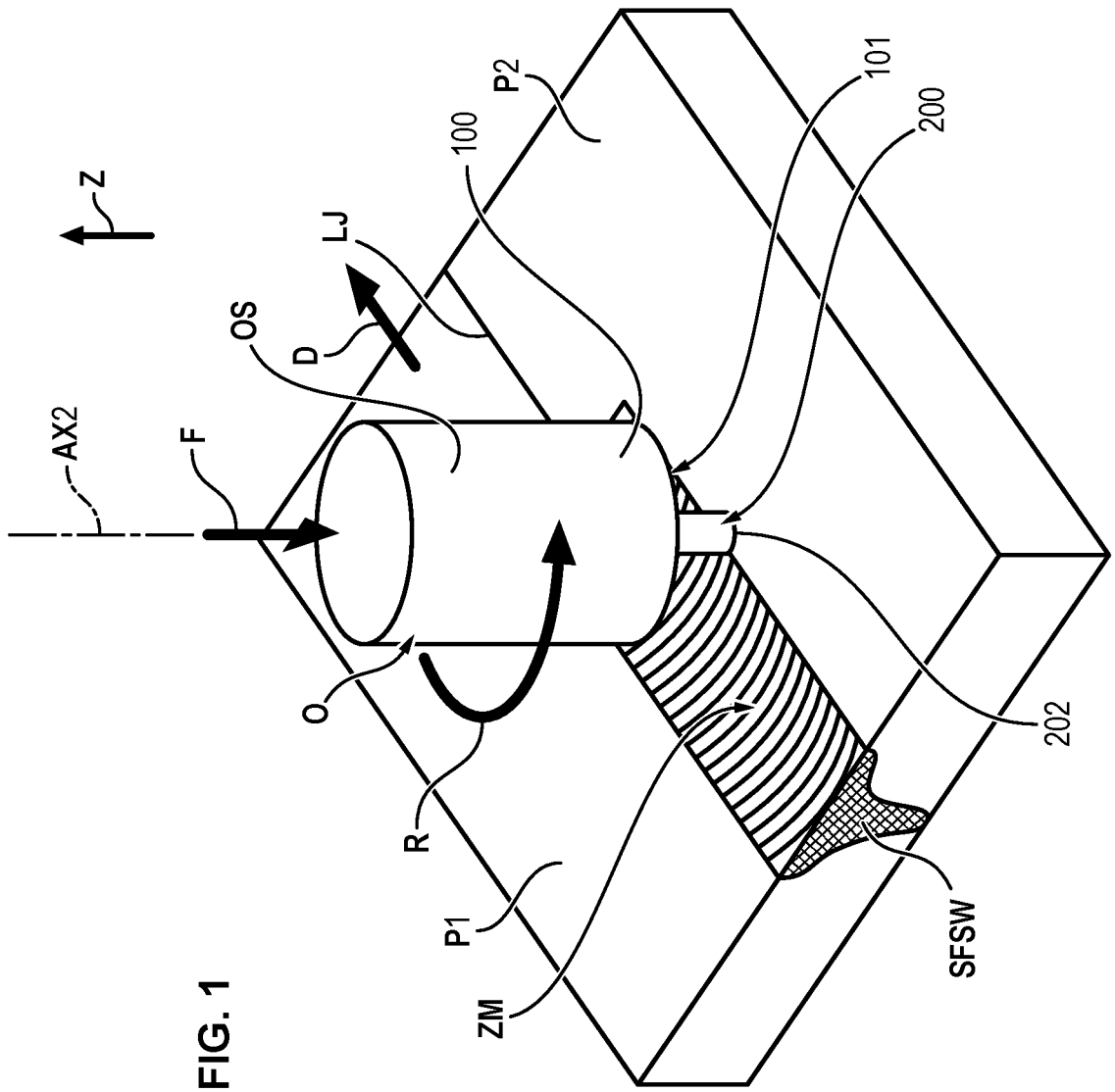
FIG. 1 represents a schematic perspective view of a friction stir welding which can be performed by the head and the method according to embodiments of the invention.
Figure 3:
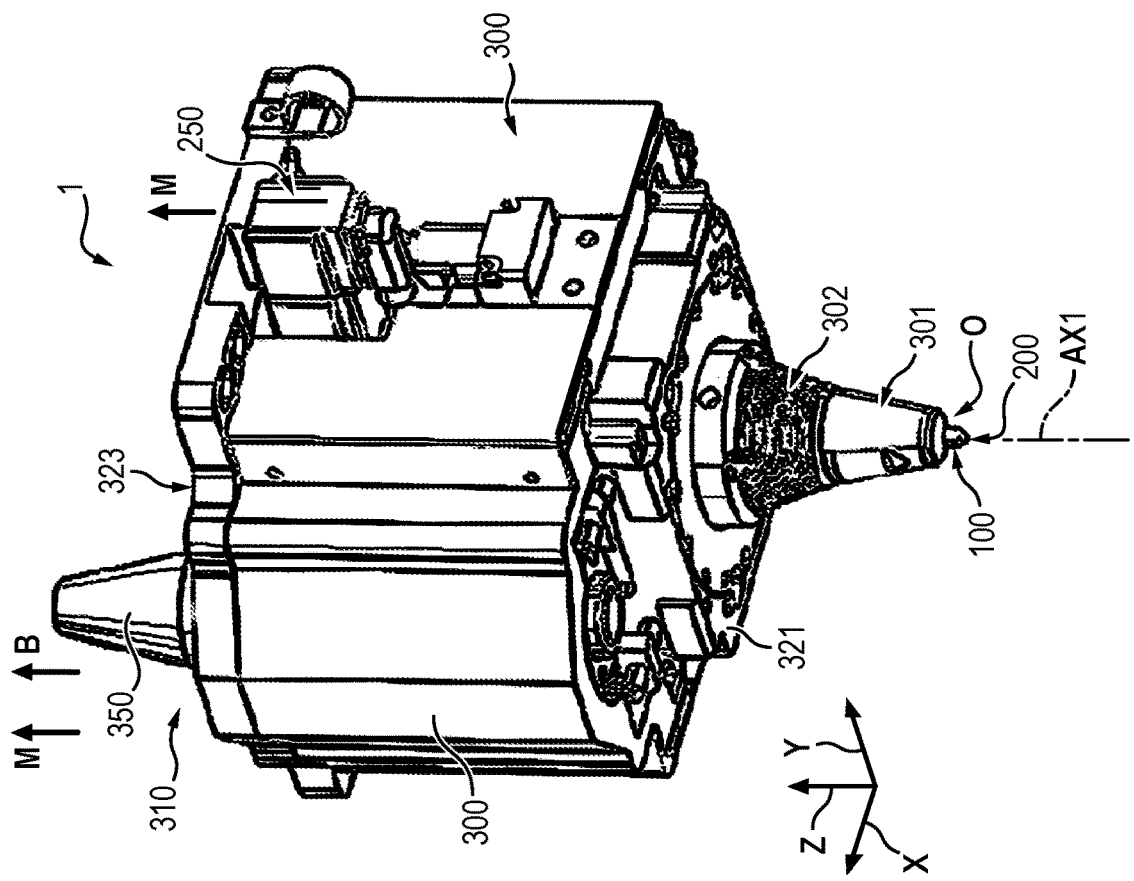
FIG. 3 represents a schematic perspective view of a welding head according to embodiments of the invention.

In FIGS. 1 to 23, the friction stir welding head 1 according to the invention comprises a frame 300, intended to be secured to a chassis C of a machine M distinct from the head 1, the welding head 1 having to be mounted on the machine M. This machine M can be a machine tool M, for example a numerically-controlled machine tool M. The machine M comprises a drive spindle B (or spindle nose B), which is rotatably mounted about an axis AX2 with respect to the chassis C.

A friction stir welding tool O can be mounted on the head 1. This friction stir welding tool O comprises a peripheral shoulder 100 and a rotating and retractable central pin 200, which is surrounded by the peripheral shoulder 100 about a first axis of rotation AX1 and which is able to protrude from the peripheral shoulder 100 along the first axis of rotation AX1. The peripheral shoulder 100 is separate from the central pin 200 that is to say the peripheral shoulder 100 is not in one piece with the central pin 200. The peripheral shoulder 100 comprises a lower welding surface 101 transverse to the first axis of rotation AX1, while the central pin 200 extends along the first axis of rotation AX1. In FIGS. 1 to 23, the first axis of rotation AX1 can be for example vertical and parallel to a vertical direction Z, oriented in the upward direction, to which a horizontal direction X called transverse direction, and a second horizontal direction Y called depth direction, perpendicular to the horizontal direction X, are perpendicular.

Figure 2:
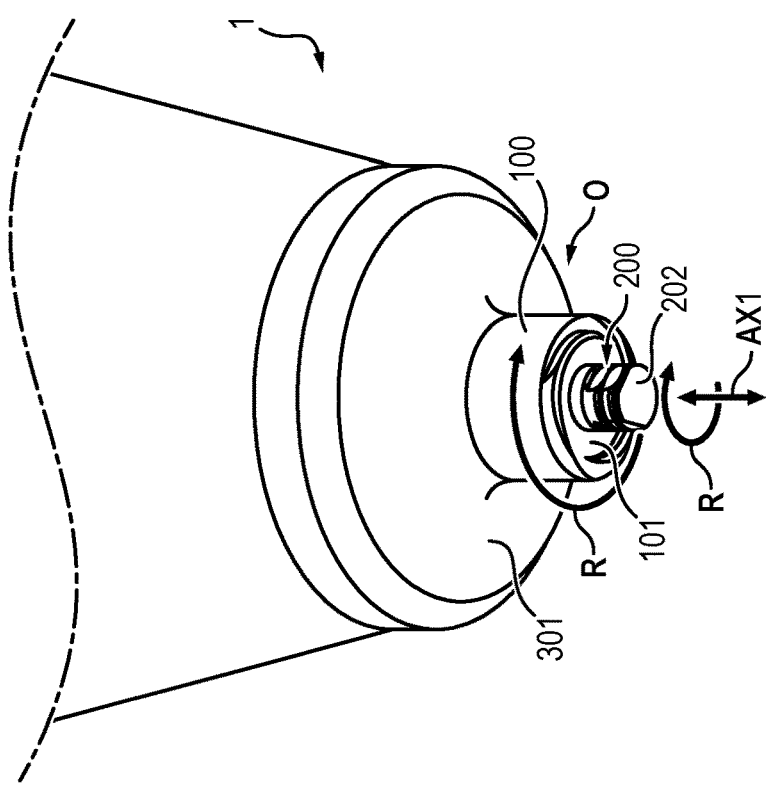
FIG. 2 represents a schematic perspective view of a welding tool which may or may not have a retractable pin and which can be mounted under the welding head according to embodiments of the invention.
Figure 4:
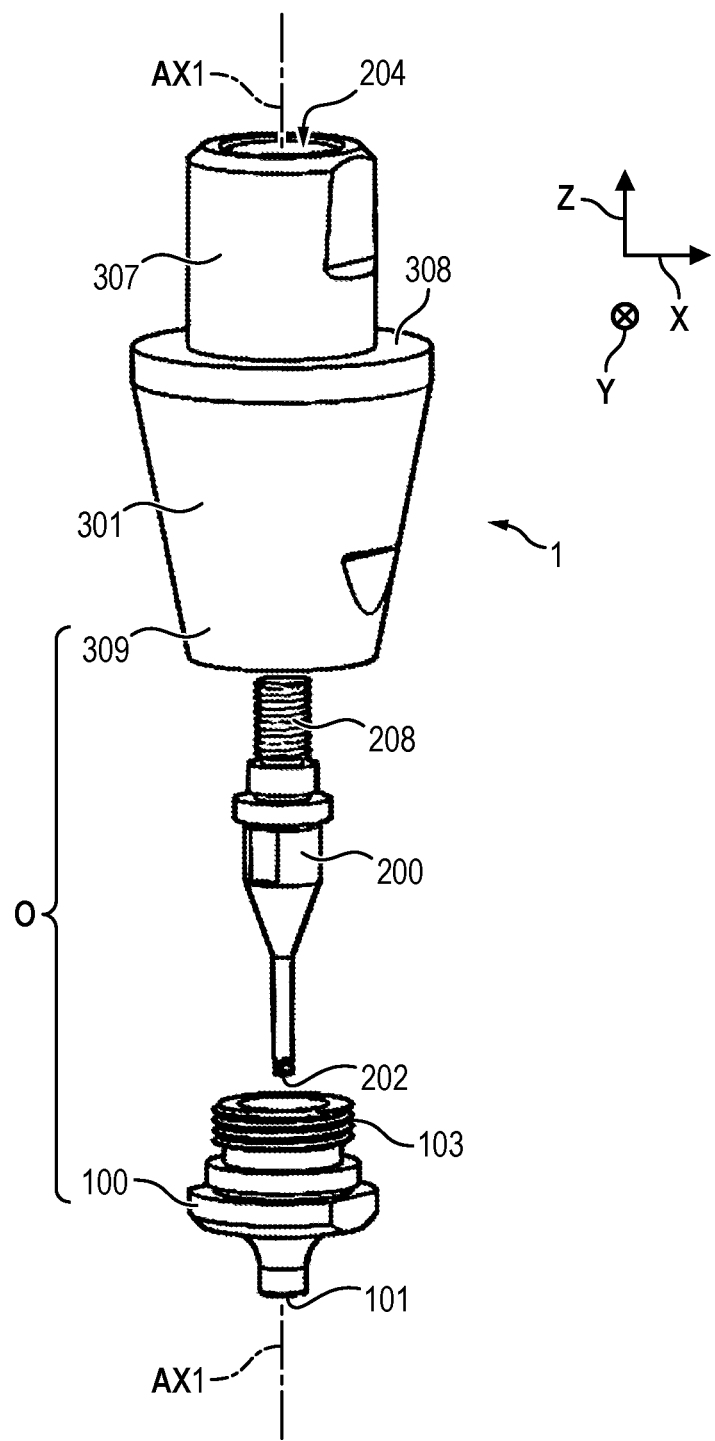
FIG. 4 represents a schematic exploded perspective view of a retractable welding tool which can be mounted under the welding head according to embodiments of the invention.

As represented in FIGS. 1 and 2, the friction stir welding is performed by rotating the peripheral shoulder 100 and the central pin 200 about the first axis of rotation AX1 (along the arrow R), to make the central pin 200 get into two (or more than two) pieces to be welded or workpieces P1 and P2, until making the shoulder 100 abut against these pieces P1 and P2, then by displacing the tool O along a prescribed path D along a joint line LJ to perform the friction stir welding SFSW. The piece P1 can be placed next to the piece P2 to perform an edge-to-edge welding of these pieces P1 and P2, as represented in FIG. 1, or below the piece P2 in order to perform a transparency welding, where the tool O totally or partially passes through the part P2 in the latter case, or in another configuration. The speed of rotation of the spindle B and therefore of the tool O can be comprised between 100 and 10,000 rpm. The rotation of the tool O therefore creates an area ZM for mixing the material of the pieces P1 and P2. The friction stir welding requires a rotational movement R, a forward movement D and a forging force F.

Figure 5:
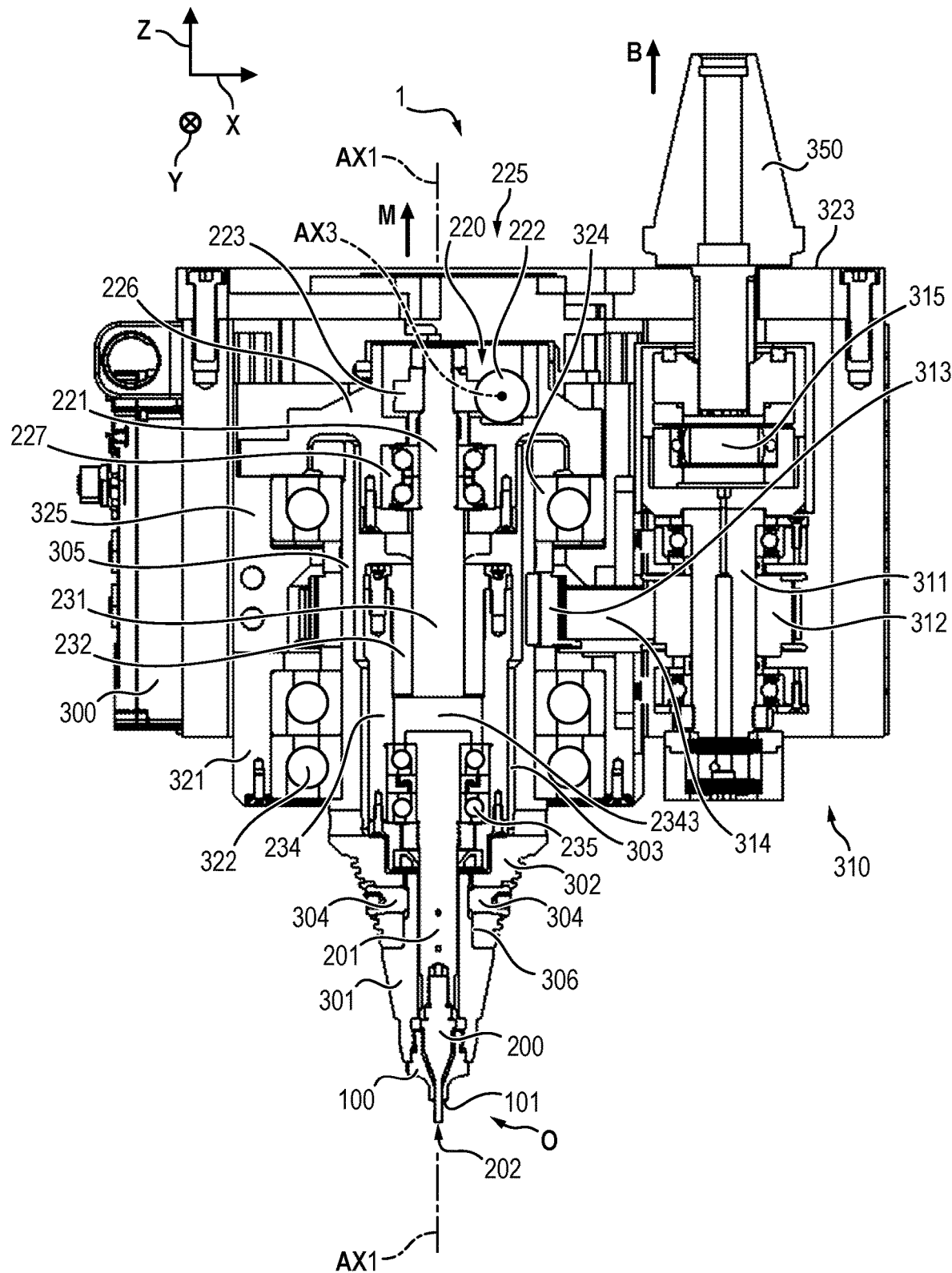
FIG. 5 represents a schematic view in vertical section of a welding head according to embodiments of the invention in a low position of the central pin.
Figure 6:
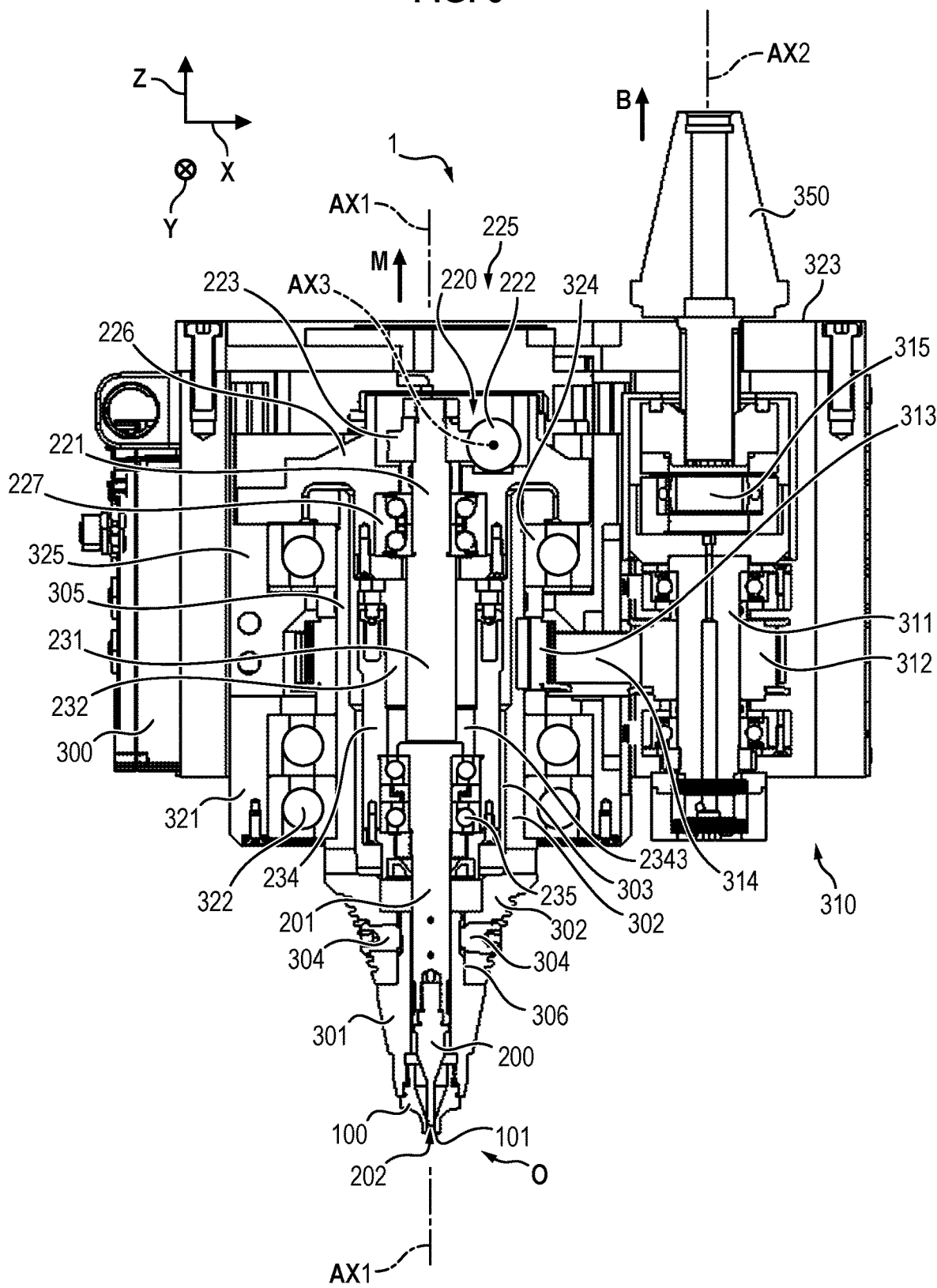
FIG. 6 represents a schematic view in vertical section of a welding head according to embodiments of the invention in a high and retracted position of the central pin.
Figure 7:
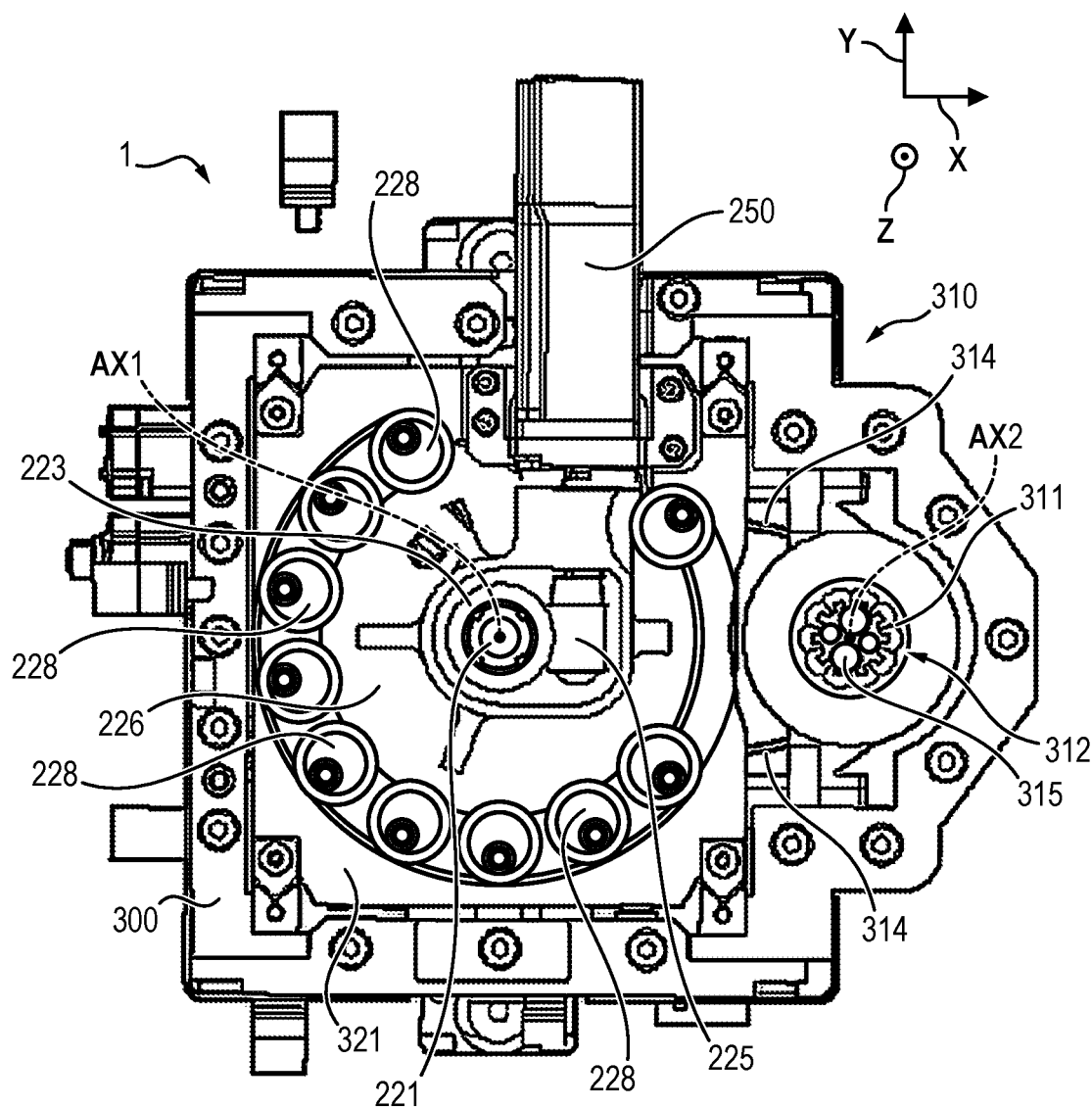
FIG. 7 represents a schematic top view of the interior of a welding head according to embodiments of the invention.
Figure 8:
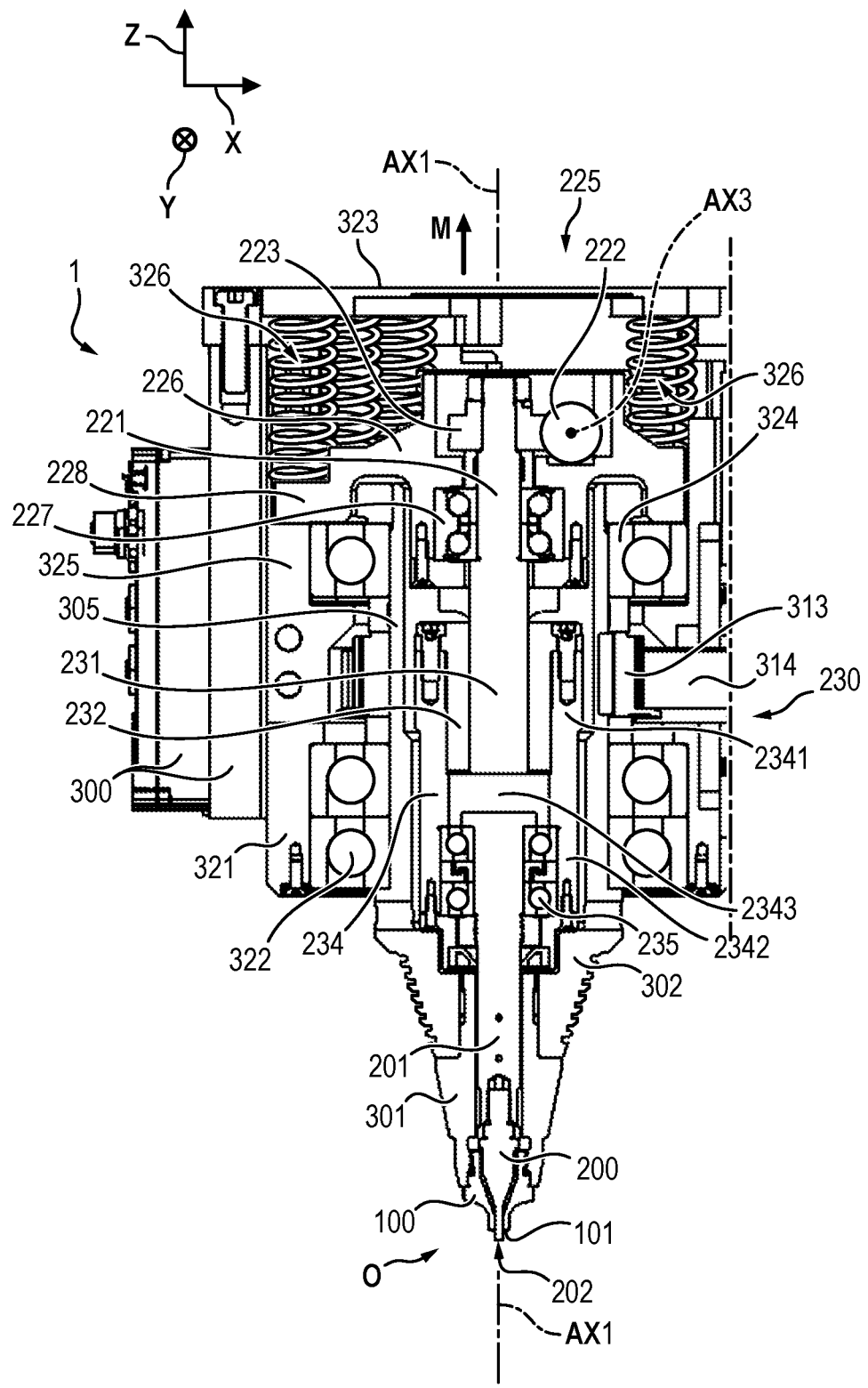
FIG. 8 represents a schematic view in vertical section of a welding head according to embodiments of the invention in an intermediate position of the central pin.

As represented in FIGS. 3 to 17, 22 and 23, the head 1 comprises a central rotary shaft 201 to which, in a mounting position of the tool O on the head 1, the central pin 200 is secured. The head 1 comprises a shoulder securing part 301 to which, in a mounting position of the tool O on the head 1, the peripheral shoulder 100 is secured. The shoulder securing part 301 is located around the central shaft 201, which projects from this shoulder securing part 301 upwards, as represented in FIGS. 5, 6 and 8. The shoulder securing part 301 is centered on the same axis AX1 as the central rotary shaft 201. The shoulder securing part 301 can for example be circular.

In FIGS. 5, 6 and 8, the head 1 comprises a primary rotary drive shaft 302, to drive in rotation both the shoulder securing part 301 and the central rotary shaft 201, and therefore both the peripheral shoulder 100 and the central pin 200 about the first axis of rotation AX1, when this peripheral shoulder 100 is mounted on the shoulder securing part 301 and when this central pin 200 is mounted on the central rotary shaft 201. For this purpose, the central rotary shaft 201 and the shoulder securing part 301 comprise a coupling device 400 for coupling them to each other, so that the central rotary shaft 201 is integral in rotation with the shoulder securing part 301 about the first axis of rotation AX1 and so that the central rotary shaft 201 is free in translation with respect to the shoulder securing part 301 along the first axis of rotation AX1. The system 400 for mechanically coupling in mechanical rotation the part 201 and the part 301 allows a degree of freedom in translation between the part 201 and the part 301. The shoulder securing part 301 is secured to the primary rotary drive shaft 302, for example by removable securing means 304 that can be actuated from outside, which can be for example one or several external screws 304. A possible embodiment of the coupling device 400 will be described below with reference to FIGS. 13 to 17.

According to one embodiment of the invention, the primary rotary drive shaft 302 is mounted by a rotation support bearing 322 or bearing (for example a ball bearing) on a lower portion of a casing 321 of the frame 300. From this casing 321, the shoulder securing part 301, the peripheral shoulder 100 and the central pin 200 project downwards when the latter projects from the peripheral shoulder 100.

As represented in FIGS. 5 to 8, 22 and 23, the head 1 comprises an external interface part 350, which is secured to the rotary spindle B of the machine M when the head 1 is mounted on the machine M. The external interface part 350 projects from the frame 300 for example from an upper surface 323 (upper wall 323) of the frame 300. The external interface part 350 is for example a shaft 350, which is distinct from the shafts 201, 302, 221, 251. The head 1 comprises a first rotation transmission device 310 for transmitting the rotation of the external interface part 350 to the primary shoulder rotary shaft 302 around the first axis of rotation AX1. Thus, when the head 1 is mounted on the machine M, the rotation of the spindle B of the machine M drives the rotation of the external interface part 350 around the second axis of rotation AX2 of this external interface part 350, which drives the rotation of the primary rotary shaft 302 via the first rotation transmission device 310.

Embodiments of this first rotation transmission device 310 are described below, as represented in FIGS. 5 to 8.

According to one embodiment of the invention, the first axis of rotation AX1, the central rotary shaft 201 and the primary rotary shaft 302 are offset by a non-zero distance (for example along the transverse horizontal direction X in FIGS. 5 to 8, 22 and 23) with respect to the second axis of rotation AX2 of the external interface part 350. The first axis of rotation AX1, the central rotary shaft 201 and the primary rotary shaft 302 are parallel with respect to the second axis of rotation AX2 of the external interface part 350. Of course, in other embodiments not represented, the first axis of rotation AX1 can be coincident with the second axis of rotation AX2.

According to one embodiment of the invention, the first rotation transmission device 310 comprises a secondary shaft 311 connected to and integral in rotation with the external interface part 350 about the second axis of rotation AX2. A first pulley 312 is secured to the secondary shaft 311 about the second axis of rotation AX2, a second pulley 313 is secured to the primary rotary shaft 302 about the first axis of rotation AX1 and a rotation transmission belt 314 is disposed around the first pulley 312 and around the second pulley 313. The belt 314 allows transmitting the rotation of the external interface part 350 about the second axis of rotation AX2 to the primary rotary shaft 302 about the first axis of rotation AX1. In other embodiments not represented, the first rotation transmission device 310 may be geared or the like between the external interface part 350 and the primary rotary shaft 302.

According to one embodiment of the invention, the secondary shaft 311 is connected to the external interface part 350 via a claw coupling 315. This in particular allows absorbing vibrations generated by the welding or compensating for possible misalignments with the spindle of the machine M.

As represented in FIGS. 3 to 17, the head 1 comprises a motor 250 for actuating the retractable pin 200 and a second translational drive device 210 for driving in translation the central rotary shaft 201 along the first axis of rotation AX1 from the motor 250 and this during the rotation of the central rotary shaft 201 and of the shoulder securing part 301 about the first axis of rotation AX1 and therefore during the rotation of the peripheral shoulder 100 and of the central pin 200 about the first axis of rotation AX1, when this peripheral shoulder 100 is mounted on the shoulder securing part 301 and when this central pin 200 is mounted on the central rotary shaft 201. The second translational drive device 210 allows translating the central rotary shaft 201 with respect to the shoulder securing part 301 and to the primary rotary shaft 302 from at least one low position of the central rotary shaft 201, represented in FIGS. 1, 2, 3, 5, 11 and 13, in which the lower end 202 of the central pin 200 projects downwards with respect to the peripheral shoulder 100 and to its lower surface 101 along the first axis of rotation AX1, to a high position of the central rotary shaft 201, represented in FIGS. 6, 12 and 14, in which the central pin 200 does not project downwards with respect to the peripheral shoulder 100 and to its lower surface 101 along the first axis of rotation AX1.

The central pin 200 and the peripheral shoulder 100 are thus separated in translation along the first axis of rotation AX1. Of course, the second translational drive device 210 allows translating the central rotary shaft 201 also from the high position to the low position. The second translational drive device 210 allows maintaining the central rotary shaft 201 and therefore the central pin 200 in the high position, in the low position and in intermediate positions (for example the intermediate position of FIG. 8) between this high position and this low position, and this during the rotation of the central rotary shaft 201 and of the shoulder securing part 301 about the first axis of rotation AX1 and therefore during the rotation of the peripheral shoulder 100 and of the central pin 200 about the first axis of rotation AX1, when this peripheral shoulder 100 is mounted on the shoulder securing part 301 and when this central pin 200 is mounted on the central rotary shaft 201.

The method for friction-stir welding the pieces P1, P2 using the welding head 1 mounted on the machine M comprises the steps described below with reference to FIGS. 20 and 21.

The external interface part 350 of the head 1 is initially secured to the rotary spindle B of the machine M, during the initial step E0.

After the initial step E0, the exit of the central pin 200 out of the peripheral shoulder 100 up to the low position, or its entry therein is controlled during step E1 by a motor 250 monitoring device (for example man-machine interface).

After the initial step E0, the rotation of the spindle B of the machine M is controlled during step E2 by a machine M monitoring device (for example man-machine interface) to cause the rotation of the central pin 200 and of the peripheral shoulder 100 about the first axis of rotation AX1.

After step E1 or E2, the head 1 is lowered for example towards the piece P1 and/or P2 during step E3 by the machine M monitoring device, to lower the peripheral shoulder 100 and the central pin 200 protruding out of the peripheral shoulder 100, which both rotate about the first axis of rotation AX1, against the piece P1 and/or P2.

After step E3, the translation of the central pin 200 with respect to the peripheral shoulder 100 is controlled during step E4 by the motor 250 monitoring device so that the lower end 202 of the central pin 200 is moved closer or away with respect to the peripheral shoulder 100, while on the one hand the peripheral shoulder 100 which is bearing against the pieces P1, P2, and on the other hand the central pin 200 both rotate about the first axis of rotation AX1.

After step E4, the head 1 is moved away with respect to the pieces P1, P2 during step E5.

Figure 20:
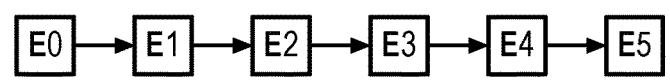
FIG. 20 represents an example of flowchart of the method according to one embodiment of the invention.

According to one embodiment of the invention, represented in FIG. 20, step E1 is prior to step E2.

Figure 21:
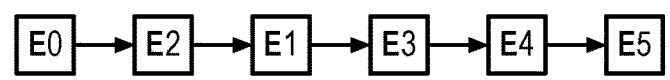
FIG. 21 represents an example of flowchart of the method according to one embodiment of the invention.

According to one embodiment of the invention, represented in FIG. 21, step E2 is prior to step E1.

Thus, to perform friction stir welding, the exit of the lower end 202 of the central pin 200 out of the peripheral shoulder 100 downwards up to an intermediate position or up to the low position is controlled by a motor 250 monitoring device and said central pin 200 is maintained in this position, where the lower end 202 of the central pin 200 is protruding downwards out of the peripheral shoulder 100 (step E1). The spindle B of the machine M is rotated by the machine M monitoring device to cause the rotation of the external interface part 350 about the second axis of rotation AX2 and, via the first transmission device 310, the rotation of the primary rotary shaft 302 about the first axis of rotation AX1, and therefore the rotation of the shoulder 100 securing part 301 and thereby the rotation of the central pin 200 and the rotation of the peripheral shoulder 100 about the first axis of rotation AX1 (step E2). Then, the head 1 is lowered towards the pieces P1 and P2 by the machine M monitoring device, to lower the lower surface 101 of the peripheral shoulder 100 and the central pin 200 protruding downwards out of this peripheral shoulder 100, which both rotate about the first axis of rotation AX1, against for example the piece P1 and/or P2, and the head 1 is moved with respect to the pieces P1 and P2 to perform the weld line SFSW along the joint line LJ according to FIG. 1 (step E3). At the end of the weld line SFSW, the head 1 and therefore the primary rotary shaft 302 of the shoulder and the peripheral shoulder 100 are held in height against the pieces P1 and P2 and the raising of the central pin 200 in translation with respect to the peripheral shoulder 100 is controlled by the motor 250 monitoring device so that the lower end 202 of the central pin 200 is lowered into an intermediate or low position or is raised into an intermediate or retracted position in the peripheral shoulder 100 in the high position (step E4), and this for example during the rotation of the first transmission device 310 about the second axis AX2 and during the rotation of the assembly: primary rotary shaft 302, shoulder securing part 301, central pin 200 and peripheral shoulder 100 about the first axis of rotation AX1. In this retracted high position, the lower end 202 of the central pin 200 can be at the same level as the lower surface 101 of the peripheral shoulder 100 or at a higher level than the lower surface 101 of the peripheral shoulder 100. The raising of the central pin 200 at least up to the high position advantageously allows leaving in the weld line SFSW an almost planar and horizontal surface, filled with material below the lower end 202 of the central pin 200 and below the peripheral shoulder 100, without leaving a hole in this weld line SFSW under the central pin 200. Then, the head 1 is raised with respect to the pieces P1 and P2 (step E5). The head 1 allows achieving the necessary forces at the lower end 202 of the central pin 200 to fill this hole or weld several thicknesses in the same weld. The translation of the central pin 200 along the first axis AX1 could be implemented by offsetting the second axis of rotation AX2 for driving in rotation the welding tool O thanks to the first rotation transmission device 310.

Figure 19:
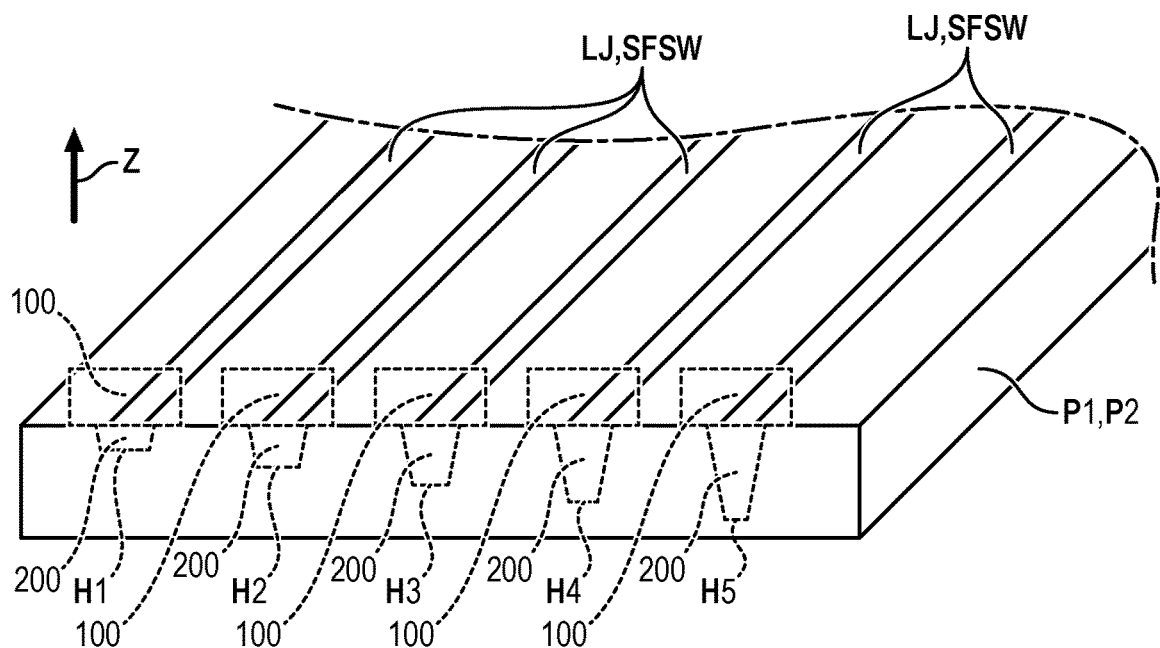
FIG. 19 represents an example of welds which can be performed on pieces by the head and the method according to the invention.

The fact that it is possible to adjust different heights of projection of the lower end 202 of the central pin 200 downwards under the lower surface 101 of the peripheral shoulder 100 in the intermediate positions and the low position (step E4) also allows welding different thicknesses of the pieces P1 and P2, as represented for example in FIG. 19 for the different heights H1, H2, H3, H4 and H5, without having to change the tool O. This function also avoids having a hole when the welding is completed.

Figure 18:
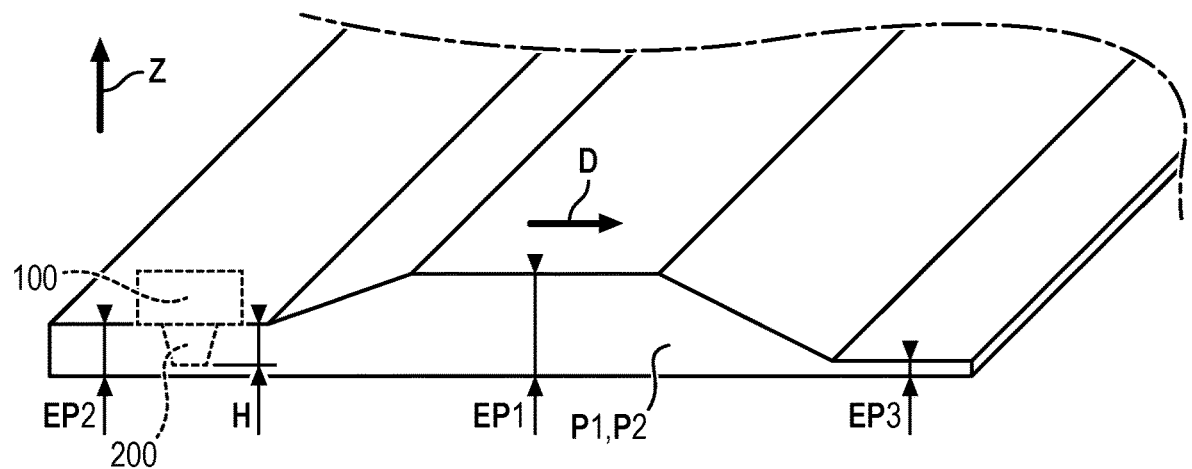
FIG. 18 represents an example of the profile of pieces which can be welded by the head and the method according to the invention.

The fact that it is possible to adjust different heights H of projection of the lower end 202 of the central pin 200 downwards under the lower surface 101 of the peripheral shoulder 100 in the intermediate positions and the low position (step E4) also allows modifying, during the horizontal displacement D of the tool O against the pieces P1 and P2 along the joint line LJ, the height H of projection of the lower end 202 of the central pin 200 downwards under the lower surface 101 of the peripheral shoulder 100 in the intermediate positions and the low position in FIG. 18, and this in a continuous manner (this would also be possible in stages of height) to take into account the thickness variations of the pieces P1 and P2 (the projection height H can be increased for great thicknesses (for example E1=3 mm in FIG. 18) compared to average thicknesses (for example E2=1.5 mm in FIG. 18); the projection height H can be reduced for small thicknesses (for example E3=0.4 mm in FIG. 18) compared to average thicknesses (for example E2=1.5 mm in FIG. 18)).

Of course, the second drive device 210 can translate the central rotary shaft 201 along the first axis of rotation AX1 from the motor 250 also in the absence of rotation of the central rotary shaft 201, of the shoulder securing part 301, of the peripheral shoulder 100 and of the central pin 200 about the first axis of rotation AX1.

Figure 22:
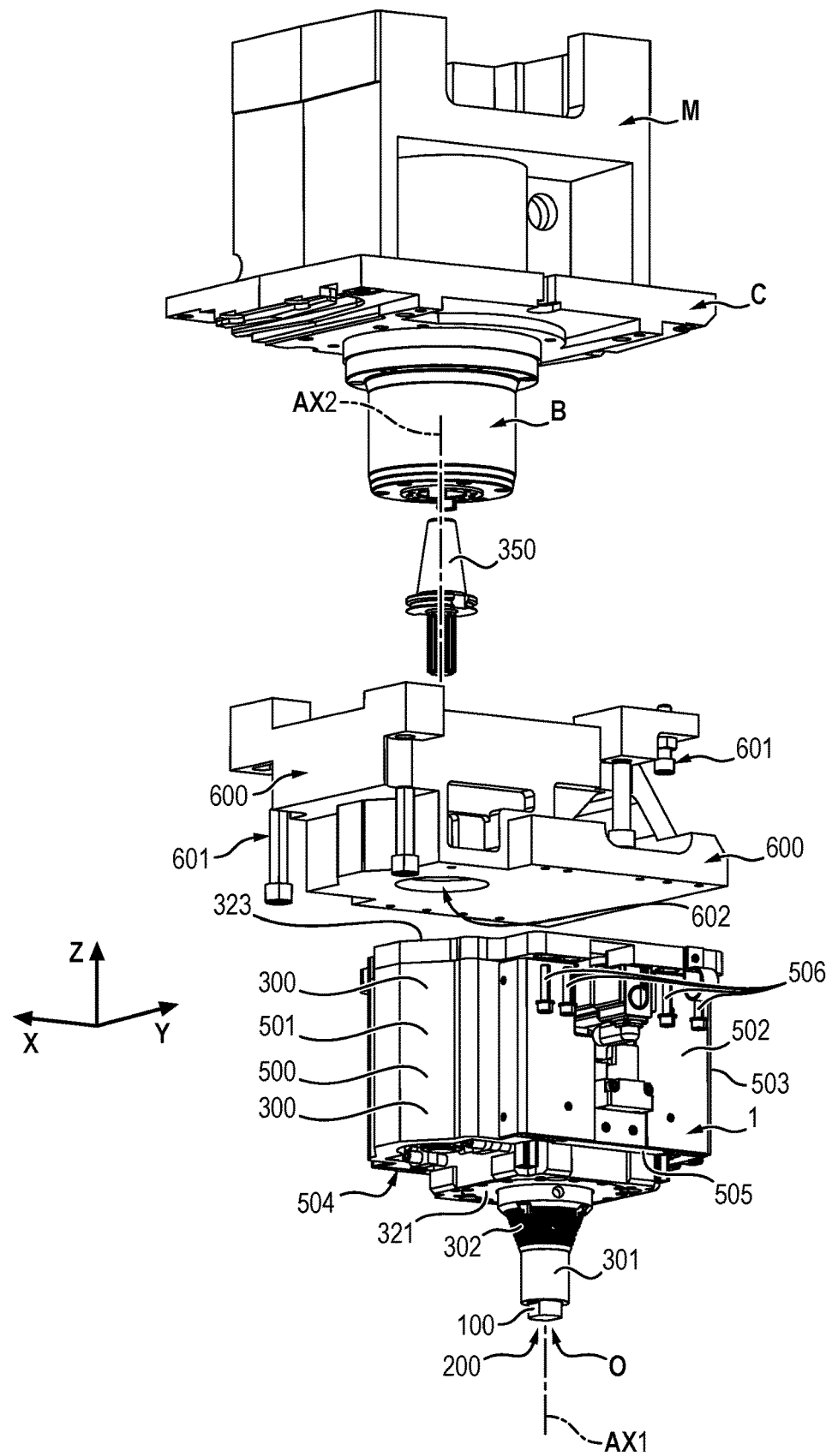
FIG. 22 represents a schematic exploded perspective view of the welding head mounted on a machine.
Figure 23:
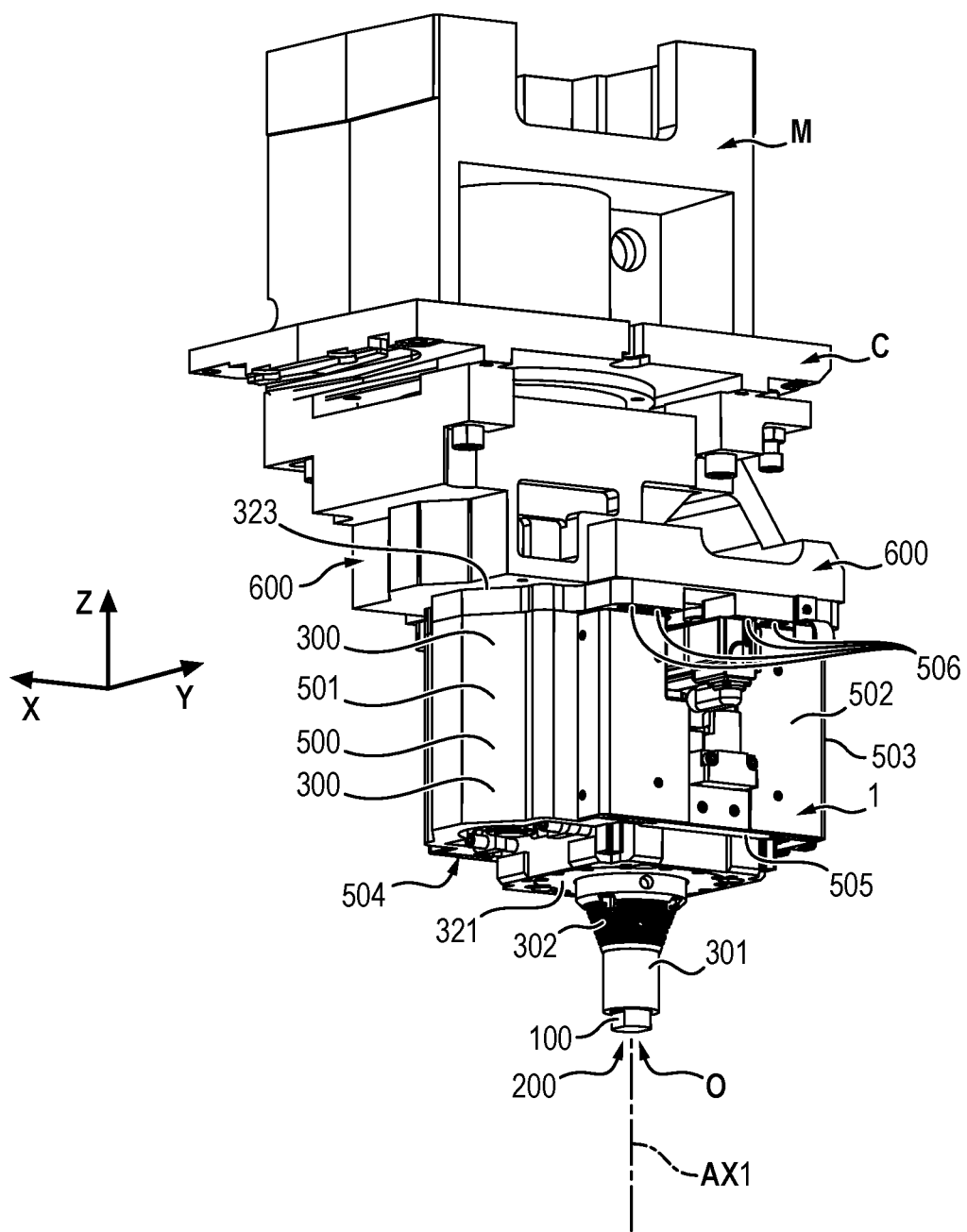
FIG. 23 represents a schematic perspective view of the welding head mounted on a machine.

The welding head 1, when it is in a mounting position on the machine M and one embodiment of the welding head 1 are described below with reference to FIGS. 22 and 23. The welding head 1 forms an effector 1.

According to one embodiment of the invention, the frame 300 can comprise an external (rigid) casing 500 comprising the upper wall 323, other external side walls 501, 502, 503, 504, secured to the upper wall 323, and a bottom wall 505. The different portions of the head 1 are in the external casing 500. The primary rotary shaft 302, the shoulder securing part 301, the central pin 200 and the peripheral shoulder 100 project from the external casing 500, namely from the bottom wall 505. The central pin 200 projects from the lower surface 101 of the peripheral shoulder 100 in the intermediate positions and in the low position. The walls 323, 501, 502, 503, 504, 505 can be rigid and/or partially planar and/or entirely planar.

In the mounting position of the welding head 1 on the machine M, the upper surface 323 of the welding head 1 and/or the casing 500 is secured to an adapter 600 (or adaptation part 600 or securing part 600). The adapter 600 is secured to the chassis C of the machine M. The welding head 1 and/or the upper surface 323 and/or the casing 500 can comprise securing or assembly members 506, for securing or assembling the welding head 1 and/or the upper surface 323 and/or the casing 500 to the adapter 600. The adapter 600 can comprise securing or assembly members 601, for securing or assembling the adapter 600 to the chassis C of the machine M. The securing members 506 can be or comprise, for example, screws 506 or bolts 506, or rods 506, or the like. The securing members 601 can be or comprise, for example, screws 601 or bolts 601, or rods 601, or the like. The adapter 600 comprises a through-hole 602 in which the external interface part 350 passes in the mounting position of the welding head 1 on the machine M. In the mounting position of the welding head 1 on the machine M, the external interface part 350 is secured to the spindle B of the machine M, for example by a mechanical coupling. In the mounting position of the welding head 1 on the machine M, the adapter 600 is between the chassis C and the upper surface 323.

According to another embodiment of the invention, the adapter 600 is in one piece with the casing 500 of the welding head 1 and is inseparable from the casing 500 of the welding head 1. In this case, the securing members 506 are not provided therewith.

Embodiments of the second device 210 for driving in translation the central shaft 201 are described below with reference to FIGS. 5 to 12.

According to one embodiment of the invention, the motor 250 comprises a tertiary rotary shaft 251 about a third axis of rotation AX3. The second translational drive device 210 comprises an intermediate shaft 221, which is offset above the central shaft 201 and which is coaxial with the first axis of rotation AX1. A rotation transmission mechanism 220 for transmitting the rotation of the tertiary rotary shaft 251 of the motor 250 about its third axis of rotation AX3 to the intermediate shaft 221 about the first axis of rotation AX1 is provided in the second translational drive device 210. In addition, a rotation transformation mechanism 230 for transforming the rotation of the intermediate shaft 221 about the first axis of rotation AX1 into a translation of the central shaft 201 along the first axis of rotation AX1 is provided in the second translational drive device 210.

Embodiments of these mechanisms 220 and 230 are described below.

Figure 9:
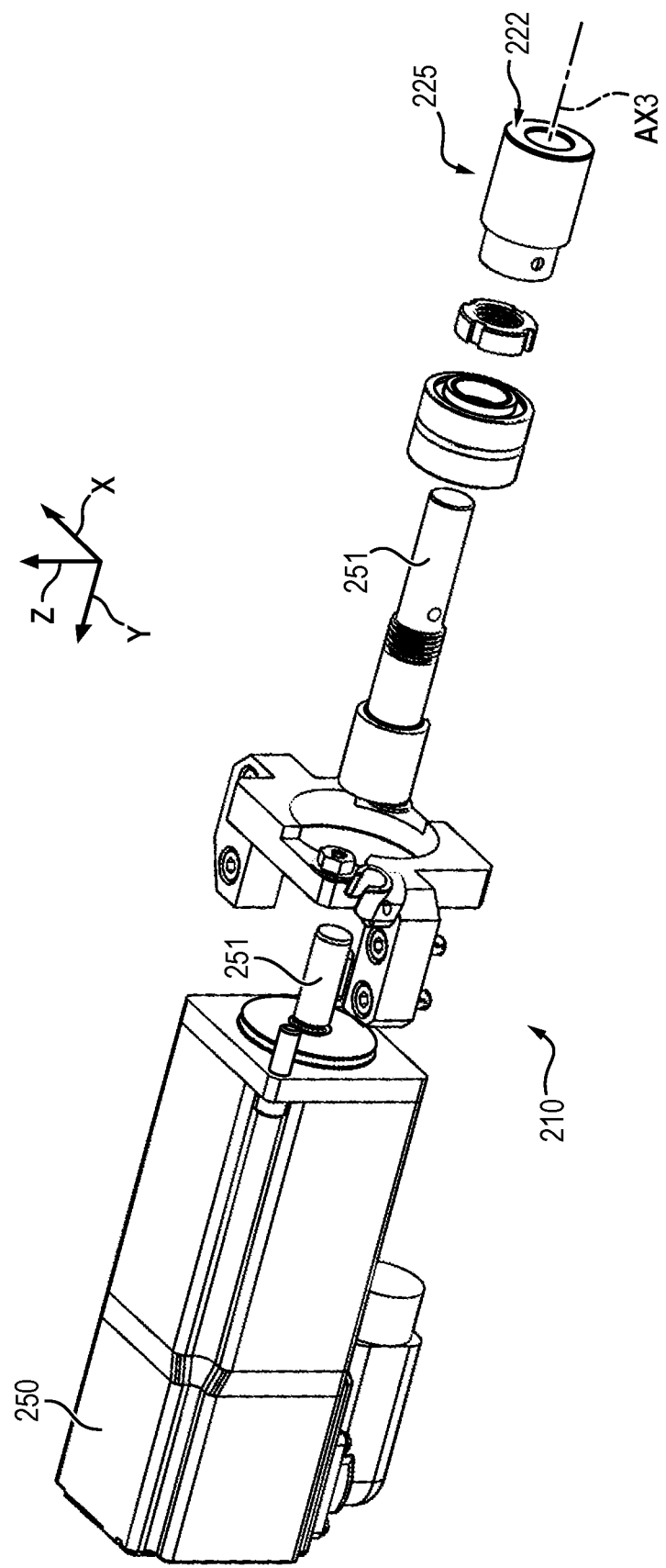
FIG. 9 represents a schematic perspective view of a portion of the welding head according to embodiments of the invention
Figure 10:
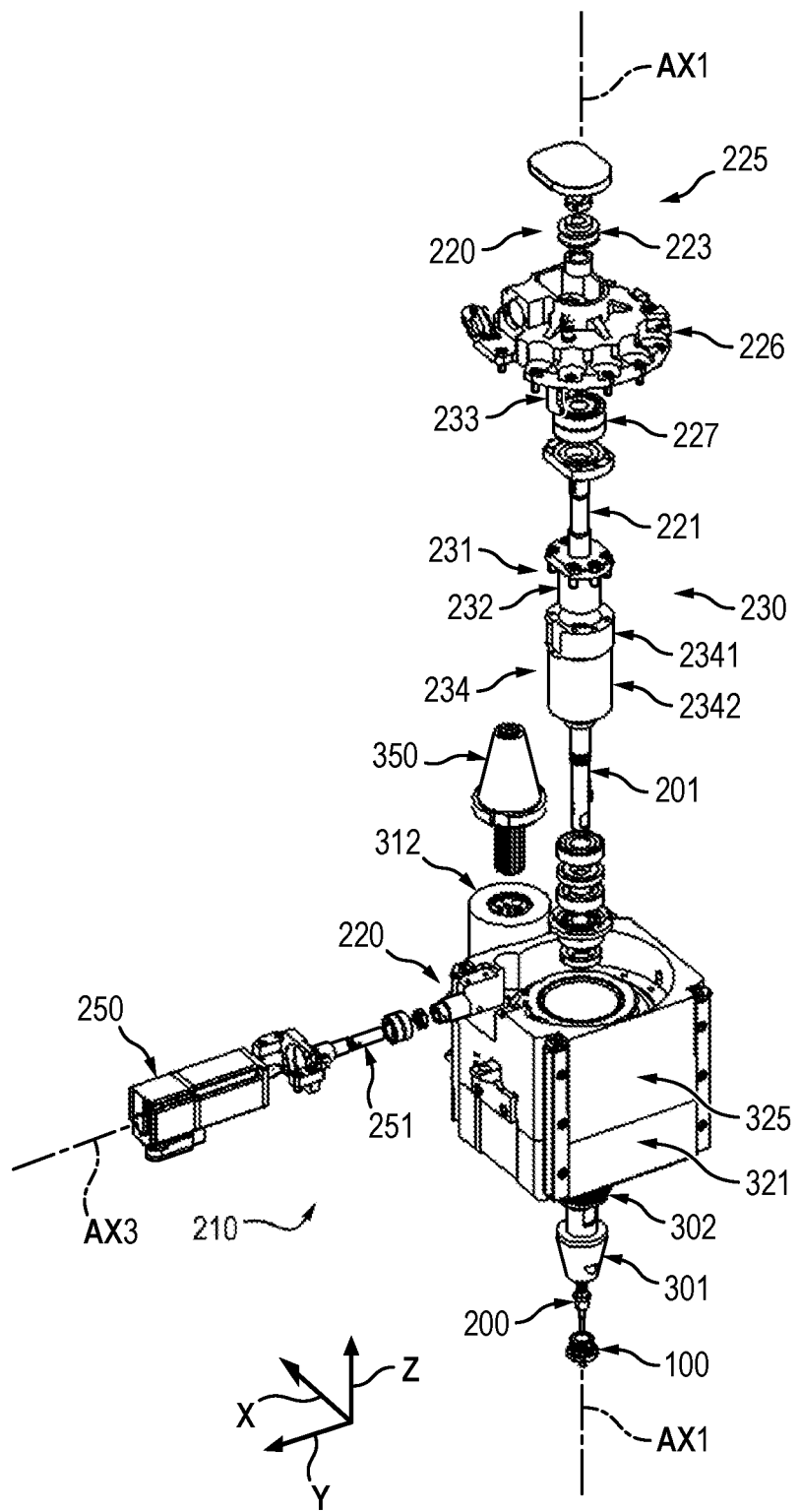
FIG. 10 represents a schematic exploded perspective view of a portion of the welding head according to embodiments of the invention.

According to one embodiment of the invention, in FIGS. 9 and 10, the third axis of rotation AX3 of the tertiary shaft 251 of the motor 250 is offset and transverse with respect to the first axis of rotation AX1, and can for example form a non-zero angle and for example perpendicular with respect to the first axis of rotation AX1. The rotation transmission mechanism 220 comprises an angle transmission mechanism 225 of the tertiary rotary shaft 251 about the third axis of rotation AX3 to the intermediate shaft 221 about the first axis of rotation AX1.

According to one embodiment of the invention, in FIGS. 9 and 10, the angle transmission mechanism 225 of the rotary tertiary shaft 251 comprises at least a first meshing member 222 secured to the tertiary shaft 251 and at least a second meshing member 223 secured to the intermediate shaft 221 and meshing with the first meshing member 222, the second meshing member 223 being rotated about the first axis of rotation AX1 by the rotation of the first meshing member 222 about the third axis of rotation AX3, these members 22 and 223 forming an angular gear.

According to one embodiment of the invention, in FIGS. 9 and 10, the angle transmission mechanism 225 of the rotary tertiary shaft 251 comprises at least a first worm screw 222 secured to the tertiary shaft 251 and at least a second toothed wheel 223 secured to the intermediate shaft 221, the second toothed wheel 223 meshing with the first worm screw 222 and being rotated about the first axis of rotation AX1 by the rotation of the first worm screw 222 about the third axis of rotation AX3. In other embodiments of the invention, the angle transmission mechanism 225 of the rotary tertiary shaft 251 may be geared or threaded between the tertiary shaft 251 and the intermediate shaft 221.

According to another embodiment of the invention, in FIGS. 9 and 10, the angle transmission mechanism 225 of the rotary tertiary shaft 251 comprises at least a first toothed wheel 222 secured to the tertiary shaft 251 and at least a second toothed wheel 223 secured to intermediate shaft 221, the second toothed wheel 223 meshing with first toothed wheel 222. The teeth of second toothed wheel 223 and of the first toothed wheel 222 can be conical to form a bevel gear, or otherwise.

According to one embodiment of the invention, in FIGS. 5, 6, 8 and 10 to 12, the intermediate shaft 221 is rotatably mounted about the first axis of rotation AX1 without possible translation along this first axis of rotation AX1 on an internal plate 226, which is mounted in the frame 300 and secured to the casing 321. The intermediate shaft 221 can be mounted by a rotation support bearing 227 or bearing 227 (for example a ball bearing 227) on the internal plate 226 and may pass through the internal plate 226.

According to one embodiment of the invention, in FIGS. 5 to 8 and 10 to 12, the rotation transformation mechanism 230 which comprises a threading 231 (first member 231) on the low portion of the intermediate shaft 221. The rotation transformation mechanism 230 comprises a second tapped member 232, which is integral in translation with the central shaft 201 along the first axis of rotation AX1. The rotation transformation mechanism 230 comprises an rotation blocking element 233 for blocking the rotation of the second tapped member 232, this blocking element 233 being secured to the internal plate 226. The intermediate shaft 221 on its threaded portion 231 and the second tapped member 232 are screwed with respect to each other about the first axis of rotation AX1 and cooperate with each other by their threading.

According to one embodiment of the invention, in FIGS. 5 to 8 and 10 to 12, the rotation support bearing 227 or bearing 227 and the internal plate 226 are located between the second toothed wheel 223 located at the top in the internal plate 226 and the rotation transformation mechanism 230, located lower in the frame 300.

According to one embodiment of the invention, in FIGS. 5 to 8 and 10 to 12, the intermediate shaft 221 forms on its lower end portion a threaded screw 231, the second tapped member 232 is a nut 232 screwed about the screw of the lower portion of the shaft 221.

According to another embodiment of the invention, not represented in the figures, the first member 231 is tapped and is a nut 231 secured to the intermediate shaft 221 or forming the lower end portion of the intermediate shaft 221, the second member 232 is threaded and is a screw 232, the nut 231 being screwed about the screw 232.

According to one embodiment of the invention, in FIGS. 5 to 8 and 10 to 12, the nut 232 can be formed by a ring 232 whose internal tapping is screwed onto the external threading 231 of the screw of the lower portion of the shaft 221. The nut 232 and the screw 231 of the lower portion of the shaft 221 can be of the ball screw type that is to say with balls between the nut 232 and the screw 231.

According to one embodiment of the invention, in FIGS. 5 to 8 and 10 to 12, the rotation transformation mechanism 230 comprises a sleeve 234, for example generally cylindrical circular about the first axis of rotation AX1, which comprises a first side 2341 secured about the second member 232 and a second side 2342 (away from the first side 2342 along the first axis of rotation AX1 downwards) in which a rotation support bearing 235 of the central shaft 201 about the first axis of rotation AX1 is secured. The sleeve 234 delimits a vertical internal compartment 2343 in which all or part of the external surface of the second member 232 and the rotation support bearing 235 of the central shaft 201 are secured. The sleeve 234 can for example be generally cylindrical circular about the first axis of rotation AX1.

According to one embodiment of the invention, in FIGS. 5 to 8 and 10 to 12, the rotation blocking element 233 can be formed by a tab 233 protruding downwards along and at a distance from the first axis of rotation AX1, this tab 233 being secured under the internal plate 226 and having a planar surface, which is parallel to the first axis of rotation AX1 and which is externally in contact against a planar surface (for example a flat), also parallel to the first axis of rotation AX1, of the second member 232 and/or of the sleeve 234.

According to one embodiment of the invention, in FIGS. 5 to 8 and 10 to 12, the rotation support bearing 235 is a bearing assembly 235, comprising at least a first bearing portion 2351 secured to the second side 2342 of the sleeve 234 and at least a second bearing portion 2352, which is secured to the central shaft 201 and which is rotatable with respect to the first bearing portion 2351.

According to one embodiment of the invention, in FIGS. 5 to 8 and 10 to 12, the sleeve 234 is located in an upper internal cavity 303 of the primary rotary shaft 302 and is surrounded by a circular cylindrical wall 305 of the primary rotary shaft 302, this circular cylindrical wall 305 delimiting the internal cavity 303 about the first axis of rotation AX1.

The sleeve 234 is movable in translation along the first axis of rotation AX1 in the internal cavity 303. The circular cylindrical wall 305 is extended downwards by the portion of the primary rotary shaft 302 protruding outwardly of the casing 321 of the frame 300 and carrying the shoulder securing part 301.

Figure 12:
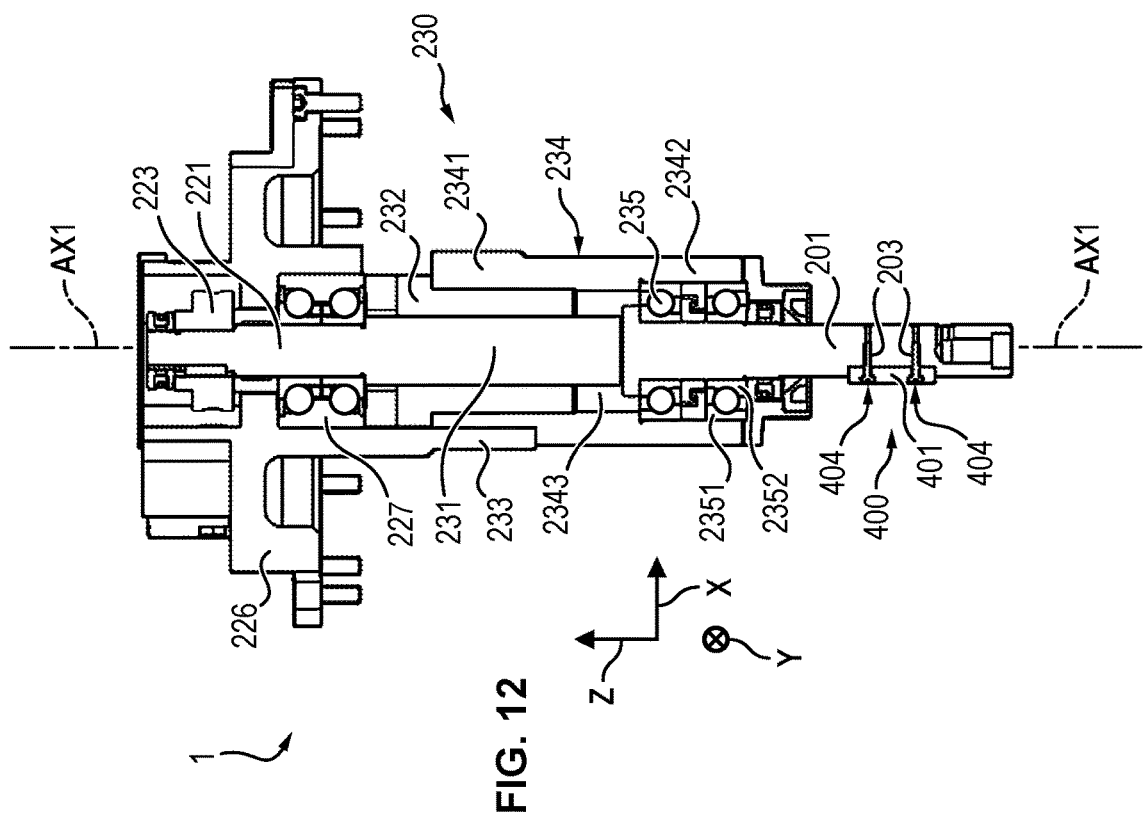
FIG. 12 represents a schematic view in vertical section of a portion of the welding head according to embodiments of the invention in the high position of the central pin.
Figure 11:
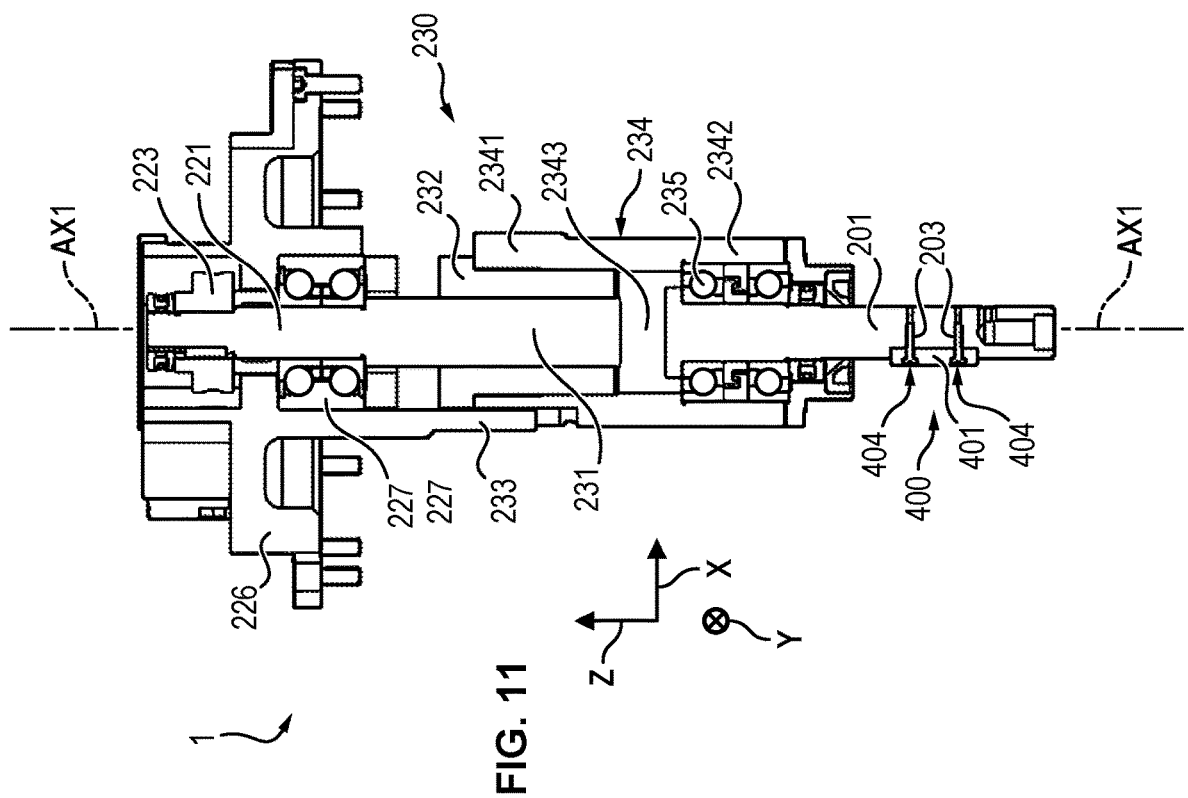
FIG. 11 represents a schematic view in vertical section of a portion of the welding head according to embodiments of the invention in the low position of the central pin.
Figure 13:
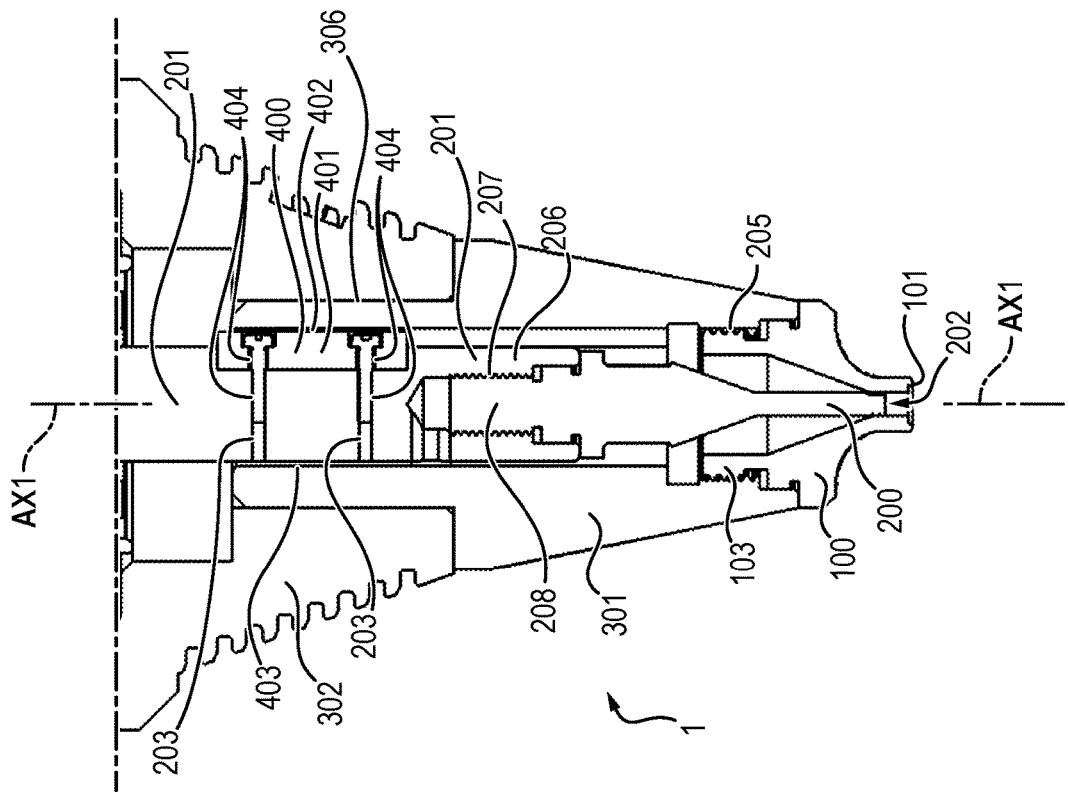
FIG. 13 represents a schematic view in vertical section of a portion of the welding head according to embodiments of the invention in the low position of the central pin.
Figure 14:
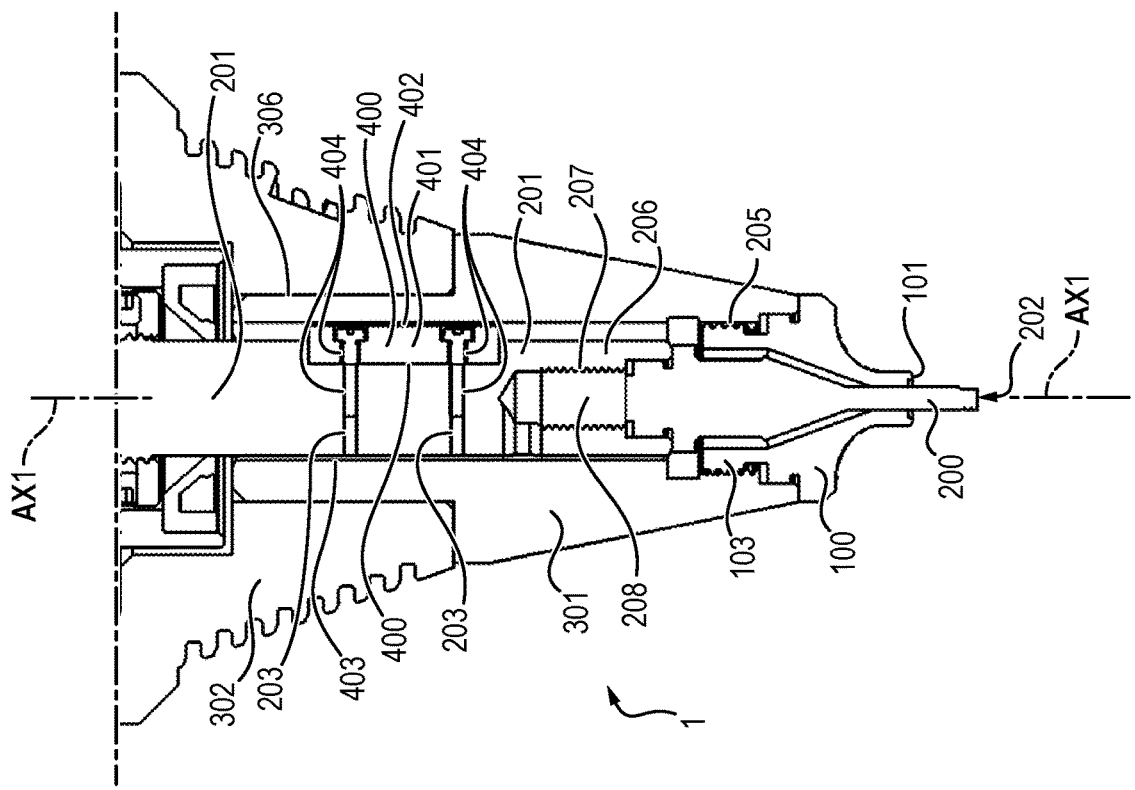
FIG. 14 represents a schematic view in vertical section of a portion of the welding head according to embodiments of the invention in the high position of the central pin.
Figure 15:
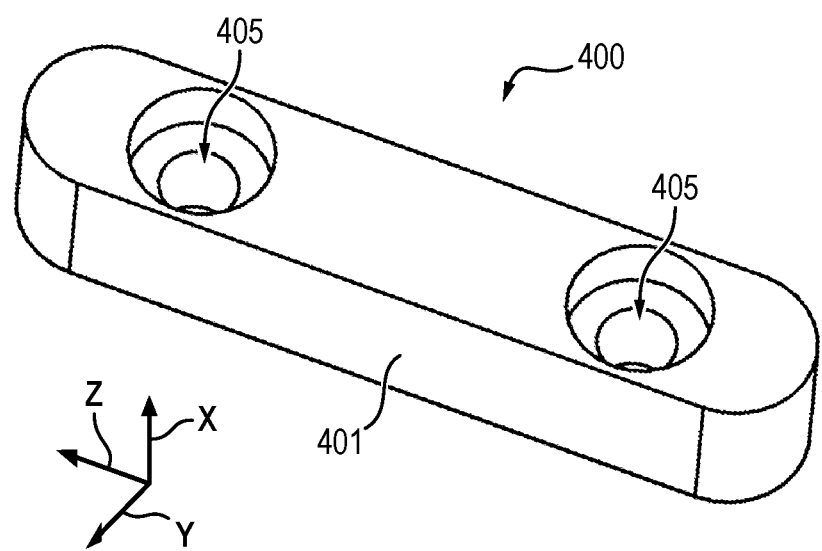
FIG. 15 represents a schematic perspective view of a portion of the welding head according to embodiments of the invention.

Thus, when the motor 250 rotates the tertiary shaft 251 in a first prescribed direction about the third axis of rotation AX3, the intermediate shaft 221 and the first member 231 of the lower portion of the shaft 221 rotate in a second prescribed direction about the first axis of rotation AX1, which, due to the blocking in rotation of the second member 232 by the element 233, raises this second member 232 and the sleeve 234 along the first axis of rotation AX1, for example to switch from the position of FIGS. 5 and 11 to the position of FIGS. 6 and 12. This raises, in the primary rotary shaft 302 and in the vertical internal compartment 2343 of the sleeve 234, the central shaft 201, which is driven in rotation about the first axis of rotation AX1 by the first rotation transmission device 310, and therefore raises the central pin 200 in the peripheral shoulder 100 to switch from the position of FIGS. 5 and 11 to the position of FIGS. 6 and 12, while the central pin 200 and the peripheral shoulder 100 are driven in rotation about the first axis of rotation AX1 by the first rotation transmission device 310.

Conversely, when the motor 250 rotates the tertiary shaft 251 in a third prescribed direction opposite to the first prescribed direction about the third axis of rotation AX3, the intermediate shaft 221 and the first member 231 of the lower portion of the shaft 221 rotate in a fourth prescribed direction opposite to the second prescribed direction about the first axis of rotation AX1, which lowers, due to the blocking in rotation of the second member 232 by the element 233, this second member 232 and the sleeve 234 along the first axis of rotation AX1, for example to switch from the position of FIGS. 6 and 12 to the position of FIGS. 5 and 11. This lowers, in the primary rotary shaft 302 and in the vertical internal compartment 2343 of the sleeve 234, the central shaft 201, which is driven in rotation about the first axis of rotation AX1 by the first rotation transmission device 310, and therefore lowers the central pin 200 in the peripheral shoulder 100, for example to switch from the position of FIGS. 6 and 12 to the position of FIGS. 5 and 11, while the central pin 200 and the peripheral shoulder 100 are driven in rotation about the first axis of rotation AX1 by the first rotation transmission device 310.

According to one embodiment of the invention, in FIGS. 5 to 8 and 10 to 12, the second pulley 313 is secured to the external surface of the circular cylindrical wall 305 of the primary rotary shaft 302 about the first axis of rotation AX1.

According to one embodiment of the invention, the rotation support bearing 322 or bearing (for example a ball bearing) is mounted around the bottom of the external surface of the circular cylindrical wall 305 of the primary rotary shaft 302 about the first axis of rotation AX1 and in the casing 321. Another rotation support bearing 324 or bearing (for example a ball bearing) can be mounted around the top of the external surface of the circular cylindrical wall 305 of the primary rotary shaft 302 about the first axis of rotation AX1 and in an internal and upper portion 325 of the casing 321 of the frame 300.

According to one embodiment of the invention, in FIGS. 13 to 17, the coupling device 400 comprises a first coupling portion 401 secured to the central rotary shaft 201 and a second coupling portion 402 secured in the shoulder securing part 301. The first coupling portion 401 and the second coupling portion 402 are able to slide along the first axis of rotation AX1 and are integral in rotation with each other.

According to one embodiment of the invention, in FIGS. 13 to 17, the coupling device 400 is disposed under the sleeve 234 and under the rotation support bearing 235 of the central shaft 201.

According to one embodiment of the invention, in FIGS. 13 to 17, the first coupling portion 401 is protruding on the central rotary shaft 201 transversely to the first axis of rotation AX1. The second coupling portion 402 is a groove 402, which extends on an internal surface 403 of the shoulder securing part 301 along the first axis of rotation AX1. The first coupling portion 401 is able to be moved in translation along the first axis of rotation AX1 in the groove 402 while being blocked in rotation about the first axis of rotation AX1 in the groove 402 to lower and raise the central rotary shaft 201 in the shoulder securing part 301.

According to one embodiment of the invention, in FIGS. 13 to 17, the first coupling portion 401 is formed by a protruding key 401, secured to the central rotary shaft 201 by one or several screws 404 passing through one or several holes 405 of the key 401 and screwed into one or several transverse tappings 203 of the central rotary shaft 201.

According to another embodiment of the invention, not represented in the figures, the second coupling portion 402 is protruding on the internal surface 403 of the shoulder securing part 301 transversely to the first axis of rotation AX1, and the first coupling portion 401 is a groove, which extends on the central rotary shaft 201 along the first axis of rotation AX1. The second coupling portion 402 can be formed by a protruding key 401, secured to the internal surface 403 of the shoulder securing part 301 by one or several screws 404 passing through one or several holes 405 of the key 401 and screwed into one or several transverse tappings 203 of the shoulder securing part 301.

In embodiments of the invention, the mechanical coupling system 400 can comprise a male coupling portion 401 and a female coupling portion 402. The male coupling portion 401 can be located on the part 301 or conversely on the central rotary shaft 201. The female coupling portion 402 can be located on the part 301 or conversely on the central rotary shaft 201.

According to one embodiment of the invention, in FIGS. 3 to 17, the primary rotary drive shaft 302 comprises a lower vertical cavity 306, which communicates with its upper internal cavity 303 and which is crossed along the first axis of rotation AX1 by the central rotary shaft 201 and by an upper portion 307 of the shoulder securing part 301 surrounding the central rotary shaft 201. The shoulder securing part 301 comprises a lower portion 309 wider than the upper portion 307 and connected to the latter by a transverse flank 308 turned upwards and mounted against a lower end surface of the primary drive rotary shaft 302. The lower portion 309 has for example a generally conical external surface about the first axis of rotation AX1. The shoulder securing part 301 comprises along the first axis of rotation AX1 a vertical recess 204, in which the central rotary shaft 201 and the central pin 200 pass. The removable securing means 304 are provided on the upper portion 307 of the shoulder securing part 301. The second coupling portion 402 is disposed in the vertical recess 204. The shoulder securing part 301 can comprise in its lower portion 309 an internal tapping 205 into which an upper threading 103 of the peripheral shoulder 100 is screwed in the mounting position of the tool O on the head 1. The central rotary shaft 201 can comprise in its lower portion 206 an internal tapping 207 into which an upper threading 208 of the central pin 200 is screwed in the mounting position of the tool O on the head 1.

According to one embodiment of the invention, in FIGS. 3, 4, 5, 6 and 8, the casing 321 is sliding along the first axis of rotation AX1 with respect to the frame 300 and is a slider 321. The casing 321 is guided in translation in the frame 300 along the first axis of rotation AX1. One or several elastic element(s) 326 for transferring the axial forces is interposed between an upper surface of the casing 321 (namely against the internal plate 226) and the upper surface 323 of the frame 300. This allows implementing a monitoring of the forces exerted on the machine via the head 1 by the pieces P1 and P2 during the friction stir welding. The elastic element(s) 326 exert(s) a prestress pushing the casing 321 to move away from the upper surface 323 of the frame 300 downwards. One or several abutment(s) against which a corresponding portion of the casing 321 comes in contact to retain the casing 321 in the frame 300 is/are provided on the frame 300. According to one embodiment, several elastic elements 326 distributed about the first axis of rotation AX1 and about the intermediate shaft 221 are provided. The elastic element 326 comprises for example at least one compression spring 326, for example several compression springs 326 distributed about the first axis of rotation AX1. This/these element(s) 326 form(s) a system for adaptation to the variations in the distance between the spindle B and the pieces P1, P2 along the first axis of rotation AX1. Of course, any other linear actuation element along the axis AX1, such as for example a cylinder, an actuator or others can be provided instead of the elastic element(s) 326 for transferring the axial forces.

Thus, when the head 1 is lowered towards the pieces P1, P2 to be welded via the lowering of the chassis C, the vibrations going up from the tool O towards the shoulder securing part 301, towards the central shaft 201 along the first axis of rotation AX1 are damped by the elastic element(s) 326 and are therefore not or very little transmitted to the spindle B of the machine M. The axial forces exerted on the tool O are transmitted to the bearing consisting for example of the bearing 322, then to the elastic element 326, which absorbs these axial forces, which are then transferred on the frame 300 and therefore the chassis C of the machine M, without passing through the spindle B of this machine M. The spindle B of the machine M is thus protected from the axial forging forces, and also from the transverse forging forces that may be due to the displacement of the tool O transversely to the axis AX1 according to the displacement D. The spindle B of the machine M therefore has to provide the head 1 only with the rotation torque to weld. The head 1 thus provides security with respect to the spindle B and has a force monitoring, that is to say a system that allows keeping a forging force within a widely acceptable range for the quality of the welds despite the geometric defects of the pieces, for example caused by rough surfaces. This allows performing repeatable welds. The man-machine interface allows monitoring the different parameters of the machine M and allows warning the operator if there is an incident, carrying out a quality control of the welds by recording the welding parameters. The man-machine interface and the automation of the retractable pin 200 can be carried out via a computer and an automaton that are autonomous and independent of the numerically-controlled machine tool, making the system completely universal.

According to one embodiment of the invention, in FIGS. 3, 4, 5, 6 and 8, each elastic element 326 can be for example a helical compression spring or an elastic washer (known as Belleville) or others. The internal plate 226 can comprise on its upper surface one or several recesses 228 into which the lower end of the elastic element(s) 326 is inserted to block it therein.

According to one embodiment of the invention, in FIGS. 3, 4, 5, 6 and 8, the casing 321 is integral with at least a first axial guide rail along the first axis of rotation AX1, the frame 300 is integral with at least a second axial guide rail along the first axis of rotation AX1, the first axial guide rail sliding with respect to the second guide rail along the first axis of rotation AX1.

Of course, the embodiments, characteristics, possibilities and examples described above can be combined with each other or selected independently of each other. Of course, the parts mentioned above may be other than the embodiments described above.

The invention claimed is:

1. A friction stir welding head, intended to be secured to a machine for carrying out friction stir welding using a tool comprising a peripheral shoulder and a central pin, which is surrounded by the peripheral shoulder about a first axis of rotation and which is able to protrude from the peripheral shoulder,
   the friction stir welding head comprising a frame, intended to be secured to a chassis of the machine,
   the friction stir welding head comprising a central rotary shaft to which the central pin is intended to be secured,
   a shoulder securing part, which is located about the central rotary shaft and to which the peripheral shoulder is intended to be secured,
   the friction stir welding head further comprising a primary drive rotary shaft rotationally attached to both the shoulder securing part and the central rotary shaft about the first axis of rotation,
   a coupling device,
   the central rotary shaft being rotationally attached to the shoulder securing part about the first axis of rotation by the coupling device providing a freedom of translation of the central rotary shaft with respect to the shoulder securing part along the first axis of rotation,
   the friction stir welding head comprising an external interface part intended to be secured to a rotary spindle of the machine and a rotation transmission device for transmitting rotation of the external interface part to the primary drive rotary shaft about the first axis of rotation, the external interface part projecting from an upper surface of the frame,
   the friction stir welding head comprising a motor and a translational drive device for driving in translation the central rotary shaft along the first axis of rotation from the motor during the rotation of the central rotary shaft and of the shoulder securing part about the first axis of rotation, between at least a low position of the central rotary shaft, in which the central pin protrudes from the peripheral shoulder along the first axis of rotation and a high position of the central rotary shaft, in which the central pin does not protrude from the peripheral shoulder along the first axis of rotation.

2. The head according to claim 1, wherein the first axis of rotation, the central rotary shaft and the primary drive rotary shaft are offset and parallel with respect to a second axis of rotation of the external interface part.

3. The head according to claim 2, wherein the rotation transmission device comprises a secondary shaft integral in rotation with the external interface part about the second axis of rotation, a first pulley secured about the secondary shaft, a second pulley secured about the primary drive rotary shaft and a rotation transmission belt between the first pulley and the second pulley to transmit rotation of the external interface part about the second axis of rotation to the primary drive rotary shaft about the first axis of rotation.

4. The head according to claim 1, wherein the motor comprises a tertiary rotary shaft about a third axis of rotation,
the translational drive device comprises an intermediate shaft which is coaxial and offset with respect to the central rotary shaft, a rotation transmission mechanism for transmitting the rotation of the tertiary rotary shaft about the third axis of rotation to the intermediate shaft about the first axis of rotation and a rotation transformation mechanism for transforming rotation of the intermediate shaft about the first axis of rotation in translation of the central rotary shaft along the first axis of rotation.

5. The head according to claim 4, wherein the tertiary shaft of the motor is rotatable about the third axis of rotation offset and transverse with respect to the first axis of rotation, the rotation transmission mechanism comprises an angle transmission mechanism of the tertiary rotary shaft about the third axis of rotation to the intermediate shaft about the first axis of rotation.

6. The head according to claim 5, wherein the angle transmission mechanism of the tertiary rotary shaft comprises at least a worm screw integral in rotation with the tertiary shaft and at least a toothed wheel integral in rotation about the intermediate shaft, the toothed wheel meshing with the worm screw.

7. The head according to claim 4, wherein the rotation transformation mechanism comprises a threaded member, which is secured to or formed by the intermediate shaft, a tapped member, which is integral in translation with the central rotary shaft along the first axis of rotation, and a rotation blocking element for blocking rotation of the tapped member,
the threaded member cooperating by a screw connection with the tapped member about the first axis of rotation,
the rotation blocking element being secured to an internal plate, about which the intermediate shaft is rotatably mounted, the internal plate being mounted in the frame.

8. The head according to claim 7, wherein the threaded member is a screw secured to or formed by the intermediate shaft, the tapped member is a nut screwed about the screw.

9. The head according to claim 7, wherein the rotation transformation mechanism comprises a sleeve, which comprises a first side secured about the tapped member and a second side in which a rotation support bearing of the central rotary shaft about the first axis of rotation is secured.

10. The head according to claim 9, wherein the rotation support bearing is a bearing assembly, comprising at least a first bearing portion secured in the second side of the sleeve and at least a second bearing portion secured to the central rotary shaft and rotatable with respect to the first bearing portion.

11. The head according to claim 9, wherein the sleeve is inserted into an internal cavity of the primary drive rotary shaft and is movable in translation along the first axis of rotation in the internal cavity.

12. The head according claim 1, wherein the coupling device comprises a first coupling portion secured to the central rotary shaft and a second coupling portion secured in the shoulder securing part, the first coupling portion cooperating by a sliding connection with the second coupling portion along the first axis of rotation and being integral in rotation with the second coupling portion.

13. The head according to claim 12, wherein the first coupling portion is protruding on the central rotary shaft transversely to the first axis of rotation, the second coupling portion is a groove, which extends over an internal surface of the shoulder securing part along the first axis of rotation and in which the first coupling portion is movable in translation along the first axis of rotation while being blocked in rotation about the first axis of rotation.

14. The head according to claim 1, wherein in the high position the central pin is retracted above a lower surface of the peripheral shoulder.

15. The head according to claim 1, wherein the shoulder securing part and the peripheral shoulder are in one piece.

* * * * *